United States Patent
Shen et al.

(10) Patent No.: US 11,037,281 B2
(45) Date of Patent: Jun. 15, 2021

(54) IMAGE FUSION METHOD AND DEVICE, STORAGE MEDIUM AND TERMINAL

(71) Applicant: Tencent Technology (Shenzhen) Company Limited, Shenzhen (CN)

(72) Inventors: Keyi Shen, Shenzhen (CN); Pei Cheng, Shenzhen (CN); Mengren Qian, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/859,331

(22) Filed: Apr. 27, 2020

(65) Prior Publication Data
US 2020/0258206 A1     Aug. 13, 2020

Related U.S. Application Data

(63) Continuation of application No. PCT/CN2018/116832, filed on Nov. 22, 2018.

(30) Foreign Application Priority Data

Nov. 22, 2017    (CN) .......................... 201711173149.X

(51) Int. Cl.
    *G06T 5/50*        (2006.01)
    *G06T 7/55*        (2017.01)
    (Continued)

(52) U.S. Cl.
    CPC ............ *G06T 5/50* (2013.01); *G06K 9/00248* (2013.01); *G06T 7/55* (2017.01); *G06T 15/50* (2013.01); *G06T 2207/20221* (2013.01)

(58) Field of Classification Search
CPC .. G06T 5/50; G06T 7/55; G06T 15/50; G06T 2207/20221; G06T 17/20; G06T 7/50;
(Continued)

(56) References Cited

U.S. PATENT DOCUMENTS 8,391,642 B1 *   3/2013   Petruszka .......... G06K 9/00295
                                                         382/285
9,314,692 B2 *   4/2016   Konoplev .......... G06K 9/00315
(Continued)

FOREIGN PATENT DOCUMENTS

CN         105184249 A     12/2015
CN         107146199 A      9/2017
(Continued)

OTHER PUBLICATIONS

Tencent Technology, ISRWO, PCT/CN2017/111832, dated Jan. 4, 2019, 6 pgs.
(Continued)

*Primary Examiner* — Phuoc Tran
(74) *Attorney, Agent, or Firm* — Morgan, Lewis & Bockius LLP

(57) ABSTRACT

Embodiments of this application disclose an image fusion method performed by a computing device. The method includes the following steps: obtaining source face image data of a current to-be-fused image and resource configuration information of a current to-be-fused resource, performing image recognition processing on the source face image data, to obtain source face feature points corresponding to the source face image data, and generating a source face three-dimensional grid of the source face image data according to the source face feature points, performing grid fusion by using a resource face three-dimensional grid and the source face three-dimensional grid to generate a target face three-dimensional grid, and performing face complex-
(Continued)

ion fusion by using source complexion data of the source face image data and resource complexion data of resource face image data on the target face three-dimensional grid, to generate fused target face image data.

20 Claims, 11 Drawing Sheets

(51) Int. Cl.
*G06K 9/00* (2006.01)
*G06T 15/50* (2011.01)

(58) Field of Classification Search
CPC ...... G06T 7/90; G06K 9/00248; G06K 9/629; G06K 9/00208; G06K 9/00268
See application file for complete search history.

(56) References Cited

U.S. PATENT DOCUMENTS 9,552,510 B2 *   1/2017   Li ........................... G06T 7/246
10,599,914 B2 *  3/2020   Li ....................... G06K 9/00281

FOREIGN PATENT DOCUMENTS

CN       107230181 A       10/2017
CN       107993216 A        5/2018

OTHER PUBLICATIONS

Tencent Technology, IPRP, PCT/CN2017/111832, dated May 26, 2020, 5 pgs.

* cited by examiner

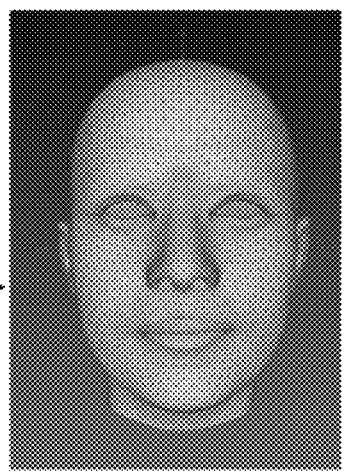
FIG. 1D  FIG. 1E
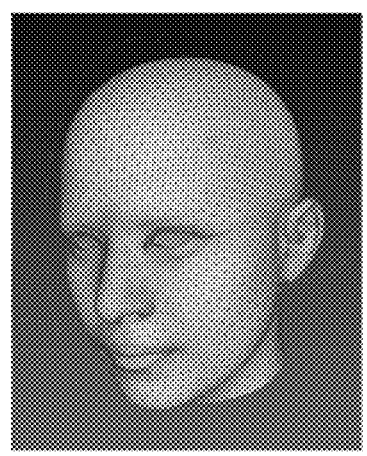
FIG. 1F
FIG. 1H  FIG. 1G

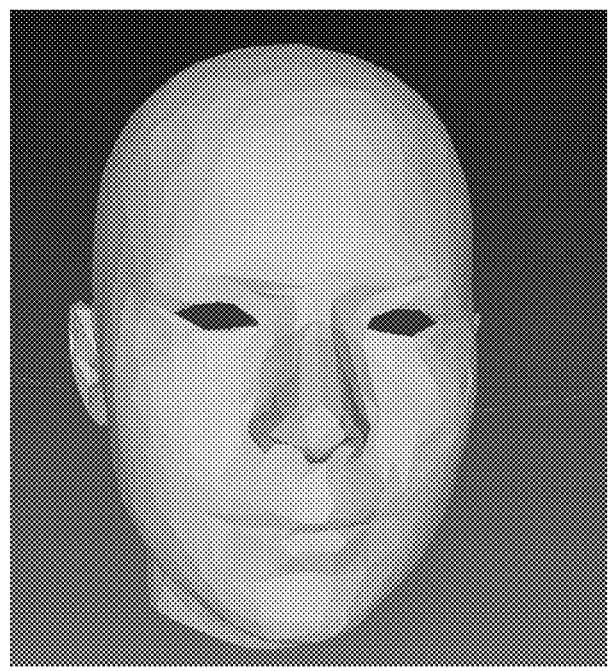
FIG. 4
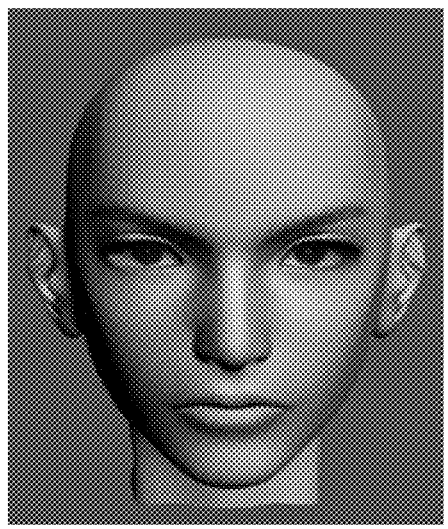 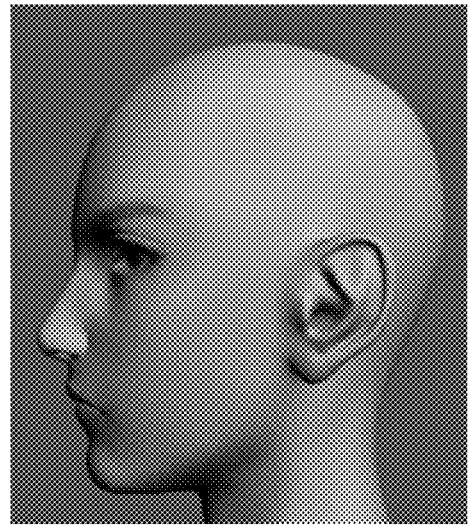
FIG. 5A  FIG. 5B

IMAGE FUSION METHOD AND DEVICE, STORAGE MEDIUM AND TERMINAL

CROSS-REFERENCE TO RELATED APPLICATIONS

This application is a continuation application of PCT Application No. PCT/CN2018/116832, entitled "IMAGE FUSION METHOD AND DEVICE, STORAGE MEDIUM, AND TERMINAL" filed on Nov. 22, 2018, which claims priority to Chinese Patent Application No. 201711173149.X, entitled "IMAGE FUSION METHOD AND DEVICE, STORAGE MEDIUM, AND TERMINAL" filed with the Chinese National Intellectual Property Administration on Nov. 22, 2017, all of which are incorporated by reference in their entirety.

FIELD OF THE TECHNOLOGY

This application relates to the field of computer technologies, and in particular, to an image fusion method and device, a storage medium, and a terminal.

BACKGROUND OF THE DISCLOSURE

With the rapid development of computer technologies, terminal devices such as a smartphone, a palmtop computer, and a tablet computer may be installed with terminal applications for processing pictures, for example, a camera, photoshopping software, and a social APP. Based on the foregoing terminal applications, users may perform processing such as adding special effects, decoration and beautification, hairdressing and makeup, and figure modelling change on original pictures (for example, figures, landscapes, or buildings) or videos. Generally, out of searching for beauty or fun, people select to beautify or modify their own face photos appropriately when posting their own photos on a social website or a webcast website.

SUMMARY

Embodiments of this application provide an image fusion method and device, a storage medium, and a terminal, so that by analyzing a process of performing image fusion on image data based on a three-dimensional model to generate target face image data, authenticity of the finally obtained target face image data can be improved.

A first aspect of the embodiments of this application provides an image fusion method, performed at a computing device having a processor and memory and a plurality of programs stored in the memory, the method comprising:
  obtaining source face image data of a current to-be-fused image and resource configuration information of a current to-be-fused resource, the resource configuration information comprising resource face image data, resource complexion data, and a resource face three-dimensional grid;
  obtaining source face feature points from the source face image data through image recognition;
  generating a source face three-dimensional grid of the source face image data according to the source face feature points;
  performing grid fusion to the resource face three-dimensional grid and the source face three-dimensional grid to generate a target face three-dimensional grid; and
  performing face complexion fusion on the target face three-dimensional grid by using source complexion data of the source face image data and the resource complexion data of the resource face image data, to generate fused target face image data.

A second aspect of the embodiments of this application provides a computing device, comprising a processor and memory, the memory storing a plurality of computer programs, wherein the computer programs, when executed by the processor, perform the aforementioned image fusion method.

A third aspect of the embodiments of this application provides a non-transitory computer storage medium, the computer storage medium storing a plurality of instructions, the instructions being configured for, when executed by a processor a computing device, perform the aforementioned image fusion method.

BRIEF DESCRIPTION OF THE DRAWINGS

To describe the technical solutions in the embodiments of this application or in the related art more clearly, the following briefly introduces the accompanying drawings for describing the embodiments or the related art. Apparently, the accompanying drawings in the following description show merely some embodiments of this application, and a person of ordinary skill in the art may still derive other drawings from the accompanying drawings without creative efforts.

FIG. 1B to FIG. 1H are schematic application diagrams of an image fusion method according to an embodiment of this application.

FIG. 4 is a schematic diagram of a face three-dimensional grid model according to an embodiment of this application.

FIG. 5A and FIG. 5B are schematic diagrams of face types according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

Generally, a process of a photo retouching terminal application processing face image data is generating, according to 2D face information of a user and 2D face information of a resource, a result image like both the user and the face in the resource by using a certain fusion algorithm. However, when fusion is performed on a user image and a resource image based on a 2D model to generate a target result image, because image information that can be extracted by the fused user image and resource image used as plane images reflects a poor effect of the real face, the final fusion effect is poor, which affects authenticity of the finally obtained target result image.

If an image fusion method provided in the embodiments of this application is applied to an image fusion device, for example, a photo retouching terminal application in the image fusion device, a more realistic picture may be obtained during photo retouching. For example, the image fusion device obtains source face image data of a current to-be-fused image and resource configuration information of a current to-be-fused resource, where the resource configuration information includes resource face image data, resource complexion data, and a resource face three-dimensional grid, then performs image recognition processing on the source face image data, to obtain source face feature points corresponding to the source face image data, and generates a source face three-dimensional grid of the source face image data according to the source face feature points, then performs grid fusion by using the resource face three-dimensional grid and the source face three-dimensional grid to generate a target face three-dimensional grid, and finally performs face complexion fusion on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate the target face image data, authenticity of the finally obtained target face image data is improved.

Figure 1A:
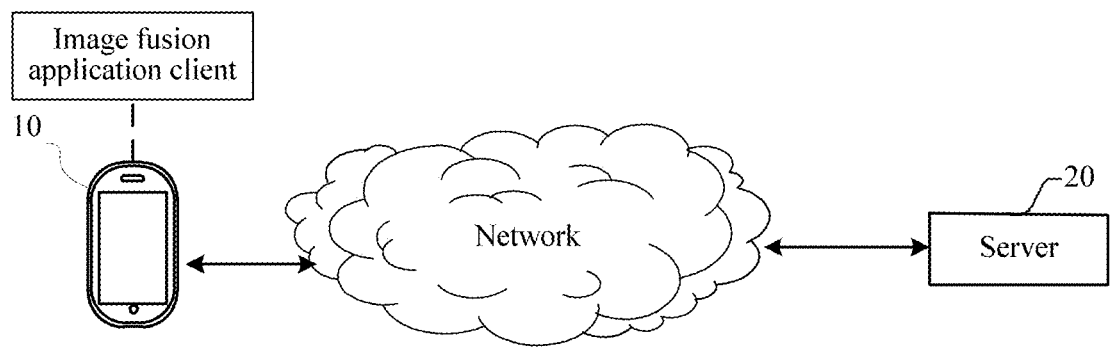
FIG. 1A is a schematic diagram of an application scenario to which the image fusion device according to the embodiments of this application is applicable.

FIG. 1A is a schematic diagram of an application scenario to which an image fusion device according to the embodiments of this application is applicable. As shown in FIG. 1A, the application scenario includes an image fusion device 10 and a server 20. The image fusion device 10 is installed with an image fusion application client. The server 20 is, for example, an image fusion application server, and communicates with the image fusion application client through a network. The image fusion application client may perform image fusion by using the image fusion method of the embodiments of this application. When a user is using the image fusion application client, an interface of the image fusion application client may prompt the user to select a to-be-fused resource, and after the user selects the to-be-fused resource, the image fusion application may obtain resource face image data of the to-be-fused resource from the image fusion device 10 locally or from the server 20. The to-be-fused resource may be a video or an image. Next, the interface of the image fusion application client may prompt the user to take a selfie, to obtain source face image data of the user face, or may guide the user to select a video or an image from an album in the image fusion device 10, to obtain source face image data. Then, the image fusion application client fuses the source face image data and the resource face image data, to form target face image data, namely, a fused face image or video, to be outputted and displayed to the user. The image fusion application client may communicate with the server 20, and update the resource face image data of the to-be-fused resource.

The image fusion device 10 may be further installed with an independent stand-alone image fusion application. In the following, the image fusion application includes the image fusion application client and the stand-alone image fusion application.

The image fusion device 10 in the embodiments of this application may be other terminal devices with an image processing function, such as a tablet computer, a smartphone, a palmtop computer, and a mobile Internet device (MID), or may be an application server with a computer processing capability that is used when various photo retouching terminal applications are performing face fusion processing.

Figure 1B:
Figure 1C:
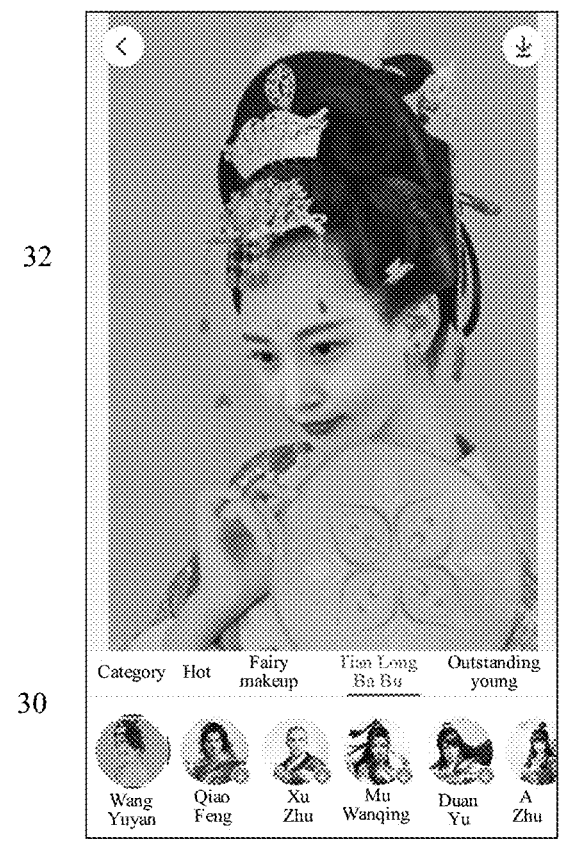
Figure 1C:
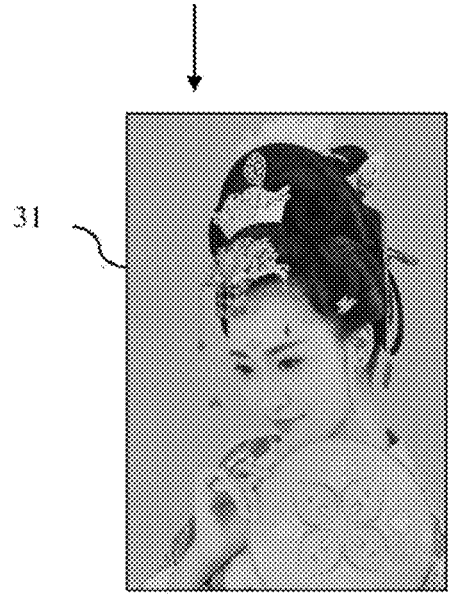

FIG. 1B to FIG. 1H are schematic application diagrams of an image fusion method according to an embodiment of this application. After a user enters an image fusion application on an image fusion device, an interface of the image fusion application has an option for the user to select a to-be-fused picture or video. Through the option, the user may select to take a selfie or obtain a to-be-fused picture or video from the image fusion device locally. The interface of the image fusion application may display a preview interface of the picture or video selected by the user, as shown in FIG. 1B. After the user selects a determining option in the preview interface, the image fusion application determines the picture or video selected by the user, to obtain source face image data. Next, the interface of the image fusion application has resource thumbnails for the user to select, as shown in FIG. 1C. The user may tap the resource thumbnails, to generate fusion results between the user face and resource images in real time. For example, a resource thumbnail 30 corresponds to a resource image 31. After the user selects the resource thumbnail 30, a result image 32 obtained after the user face and the resource image 31 are fused is generated. Next, the user may select a button 33 on the interface to save the fusion result image. In the process, the to-be-fused face image of the user is a front face, and the face in to-be-fused resource image is a side face. Therefore, during the fusion, after obtaining the picture (as shown in FIG. 1D) selected by the user, the image fusion application obtains a 3D image of the user face, as shown in FIG. 1E. Next, the image fusion application rotates the 3D image of the user face to a 3D image having a face angle consistent with that in the resource image, as shown in FIG. 1F. The image fusion application sticks the texture of the face image of the user onto the rotated 3D image, as shown in FIG. 1G. Finally, the fusion result image shown in FIG. 1H is generated.

The following describes the image fusion method provided in this embodiment of this application in detail with reference to FIG. 2 to FIG. 9.

Figure 2:
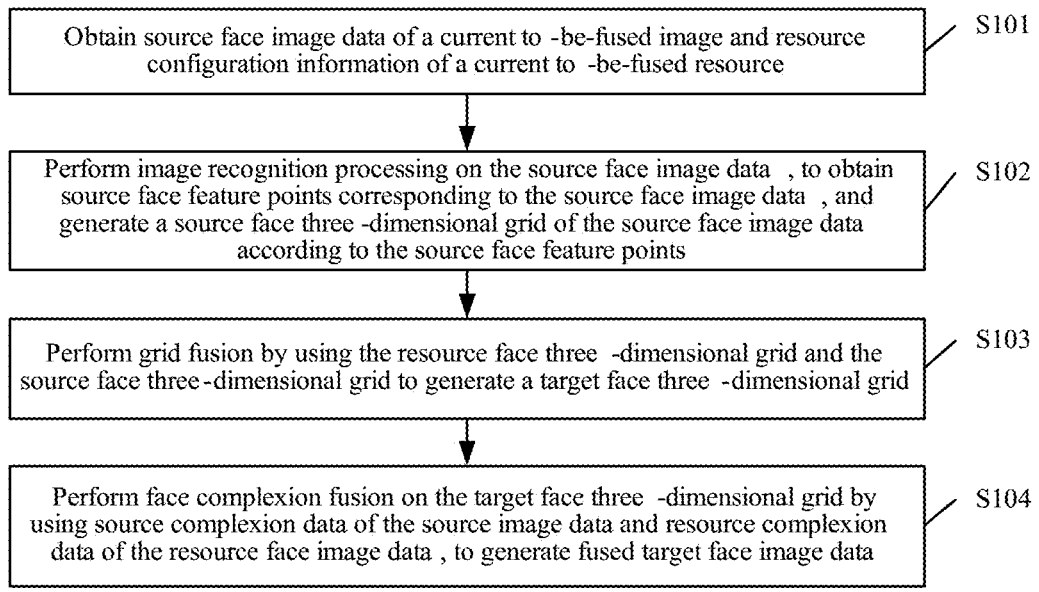
FIG. 2 is a schematic flowchart of an image fusion method according to an embodiment of this application.
Figure 3:
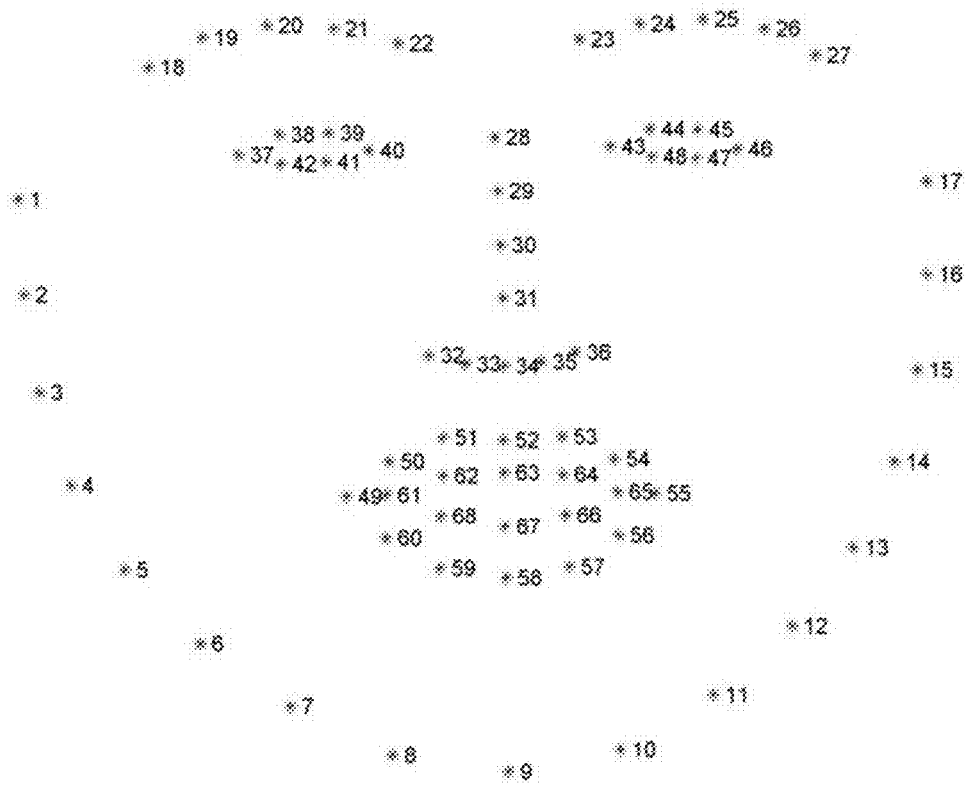
FIG. 3 is a schematic diagram of positions of face reference points according to an embodiment of this application.

FIG. 2 is a schematic flowchart of an image fusion method according to an embodiment of this application. As shown in FIG. 2, the method of this embodiment of this application may include the following step S101 to step S104.

S101. Obtain source face image data of a current to-be-fused image and resource configuration information of a current to-be-fused resource.

According to this embodiment of this application, an image fusion device may obtain source face image data of a current to-be-fused image and resource configuration information of a current to-be-fused resource. The source face image data may be face image data of a photo or a video taken by a user currently by using the image fusion device or selected from an album of the image fusion device. The current to-be-fused resource may be a resource model used for photo retouching that is in a photo retouching terminal application (for example, XXtupic, XXshop, or XXcamera) and that is selected by the user currently, for example, an anime character image or a celebrity photo. The resource configuration information may include 3D avatar information (for example, may be a file in obj format, and the file may include information representing resource face-related data, such as resource face image data, resource complexion data, and a resource face three-dimensional grid) of the current to-be-fused resource, information indicating a head effect in a final result image (the information may include an orientation (Euler angle pitch, yaw, and roll), a central position (a specified position of the final result image), scale information and camera information matching the scale information (for example, the information is depicted by using a perspective matrix), and the like of a resource 3D avatar in a world coordinate system), a 2D sticker and a 3D sticker, and a fusion degree alpha of a user face and a resource face (all frames may have the same fusion degree or each frame has a different fusion degree). The avatar may be an image of an entire head, or may be an image of a facial region only.

According to this embodiment of this application, the scale of the resource face image data for generating the target face image data and the scale of the source face image data need to correspond to the same dimension, but facial concavity and plumpness of them may not be completely consistent. Therefore, after the source face image data and the resource face image data are obtained, the scale of the source face image data may be adjusted according to the scale of the resource face image data, to make the source face image data and the resource face image data correspond to the same dimension.

S102. Perform image recognition processing on the source face image data, to obtain source face feature points corresponding to the source face image data, and generate a source face three-dimensional grid of the source face image data according to the source face feature points.

According to this embodiment of this application, the image fusion device may perform image recognition processing on the source face image data, to obtain source face feature points corresponding to the source face image data. The image recognition processing may be a process of performing recognition and facial feature location on a user face in a photo by using a face detection technology (for example, face detection provided by the cross-platform computer vision library OpenCV, the new vision service platform Face++, or the Utu face detection), the source face feature points may be data points that can represent facial features (for example, a facial contour, an eye contour, a nose, and lips) of the source face image data.

According to this embodiment of this application, the image fusion device may perform image recognition processing on the source face image data, to obtain reference feature points of the source face image data (for example, may perform recognition and facial feature location on a user face in a photo, to obtain a certain quantity of reference feature points), and then perform three-dimensional depth information extraction on the reference feature points, to obtain source face feature points corresponding to the reference feature points. The three-dimensional depth information extraction may be a process of deducing feature points that can reflect the source face image data in a three-dimensional model based on the foregoing reference feature points by matching facial feature points of a standard three-dimensional model. The reference feature points may be reference points indicating facial features, for example, points such as a facial contour, an eye contour, a nose, and lips, and may be 83 reference points, or may be 68 reference points shown in FIG. 3. The specific point quantity may be determined by developers according to requirements. The source face feature points may be feature points that can correspond to the three-dimensional model of the source face image data after further deepening based on the reference feature points. For example, through the three-dimensional depth information extraction on the foregoing 68 or 83 reference points, 1000 deepened source face feature points may be obtained, which may be vertexes of triangular patches shown in FIG. 4.

Further, the image fusion device may generate a source face three-dimensional grid of the source face image data according to the source face feature points. The source face three-dimensional grid may be a 3D face grid model corresponding to the face in the source face image data, for example, a 3D face grid shown in FIG. 4 or similar to a 3D face grid of only half of a face in FIG. 4.

S103. Perform grid fusion by using the resource face three-dimensional grid and the source face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

Specifically, the image fusion device may perform grid fusion by using the resource face three-dimensional grid and the source face three-dimensional grid to generate a target face three-dimensional grid. The resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. According to this embodiment of this application, when the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG. 4, the resource face three-dimensional grid finally projected on a 2D image may present a side face effect.

According to this embodiment of this application, the image fusion device may calculate target face feature points of a target face according to the face feature points in the source face three-dimensional grid and the resource face three-dimensional grid, and then generate a target face three-dimensional grid according to the calculated target face feature points. For example, a 3D source face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device may use algorithms such as an image deformation using moving least squares (MLS) method, affine transformation, and image distortion, to make facial feature positions of the source face image data and the resource face image data tend to facial feature positions indicated by the foregoing red face feature points, namely, the target face feature points, to achieve the objective of face fusion.

S104. Perform face complexion fusion on the target face three-dimensional grid by using source complexion data of the source image data and resource complexion data of the resource face image data, to generate fused target face image data.

According to this embodiment of this application, after generating the target face three-dimensional grid, the image fusion device needs to perform complexion filling on different triangular patches in the target face three-dimensional grid to obtain the final target face image data.

Specifically, the image fusion device may perform face complexion fusion on the target face three-dimensional grid by using source complexion data of the source face image data and resource complexion data of the resource face image data, to generate fused target face image data. According to this embodiment of this application, the source complexion data may be a set of source pixel points forming the source face image data, and the resource complexion data may be a set of resource pixel points forming the resource face image data.

According to this embodiment of this application, if types of the source face three-dimensional grid and the resource face three-dimensional grid are inconsistent, grid supplementing needs to be performed on the source face three-dimensional grid, to generate a candidate face three-dimensional grid. The types may be grid elements in the source face three-dimensional grid and the resource face three-dimensional grid. Candidate complexion data of the candidate face three-dimensional grid may be symmetrical source face image data, namely, the candidate complexion data of the candidate face three-dimensional grid may be regarded as the source complexion data. The image fusion device may calculate target pixel points of the target face image data according to the foregoing source pixel points, the resource pixel points, and a fusion degree (may be a fusion value set according to an empirical value, and the general value ranges from 0 to 1) in the resource configuration information, to further fill the target face three-dimensional grid according to the target pixel points to generate the target face image data. For example, it is set that: pixels of a feature point on a triangular patch in a source face three-dimensional grid are: UserB, UserG, and UserR, pixels of a facial feature point at a corresponding position on the corresponding triangular patch in a resource face three-dimensional grid are: ResourceB, ResourceG, and ResourceR, pixels of a feature point at the corresponding position on the corresponding triangular patch in a target face three-dimensional grid are: TargetB, TargetG, and TargetR, and the fusion degree in the resource configuration information is: alpha, there are:

TargetB=(1.0−alpha)*UserB+alpha*ResourceB

TargetG=(1.0−alpha)*UserG+alpha*ResourceG

TargetR=(1.0−alpha)*UserR+alpha*ResourceR

Therefore, each pixel value of the target face image data may be obtained, to obtain the target face image data.

According to this embodiment of this application, the finally generated target face image data may be three-dimensional face image data, or may be two-dimensional face image data. When the target face image data is two-dimensional face image data, because the process of generating the target image data is implemented based on the three-dimensional model, the effect of the finally formed target face image data is more realistic in consideration of problems such as real light and shadows.

According to this embodiment of this application, the candidate complexion data of the candidate face three-dimensional grid may include two parts, namely, complexion data of a part of the candidate face three-dimensional grid matching the source face three-dimensional grid is the source complexion data, and complexion data of a part of the candidate face three-dimensional grid not matching the source face three-dimensional grid is average complexion data. The average complexion data may be complexion data obtained after the source complexion data is subjected to complexion balance processing. According to this embodiment of this application, the complexion balance processing may be a process of removing effects such as shadows caused by light or the like from the source face image data to obtain a complexion average value. The image fusion device may calculate the target pixel points of the target face image data according to candidate pixel points of the foregoing candidate complexion data, the resource pixel points, and the fusion degree in the resource configuration information, to further fill the target face three-dimensional grid according to the target pixel points to generate the target face image data. The specific calculation process is consistent with the foregoing calculation process, and details are not provided herein again.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate the target face image data, authenticity of the finally obtained target face image data is improved.

Figure 6:
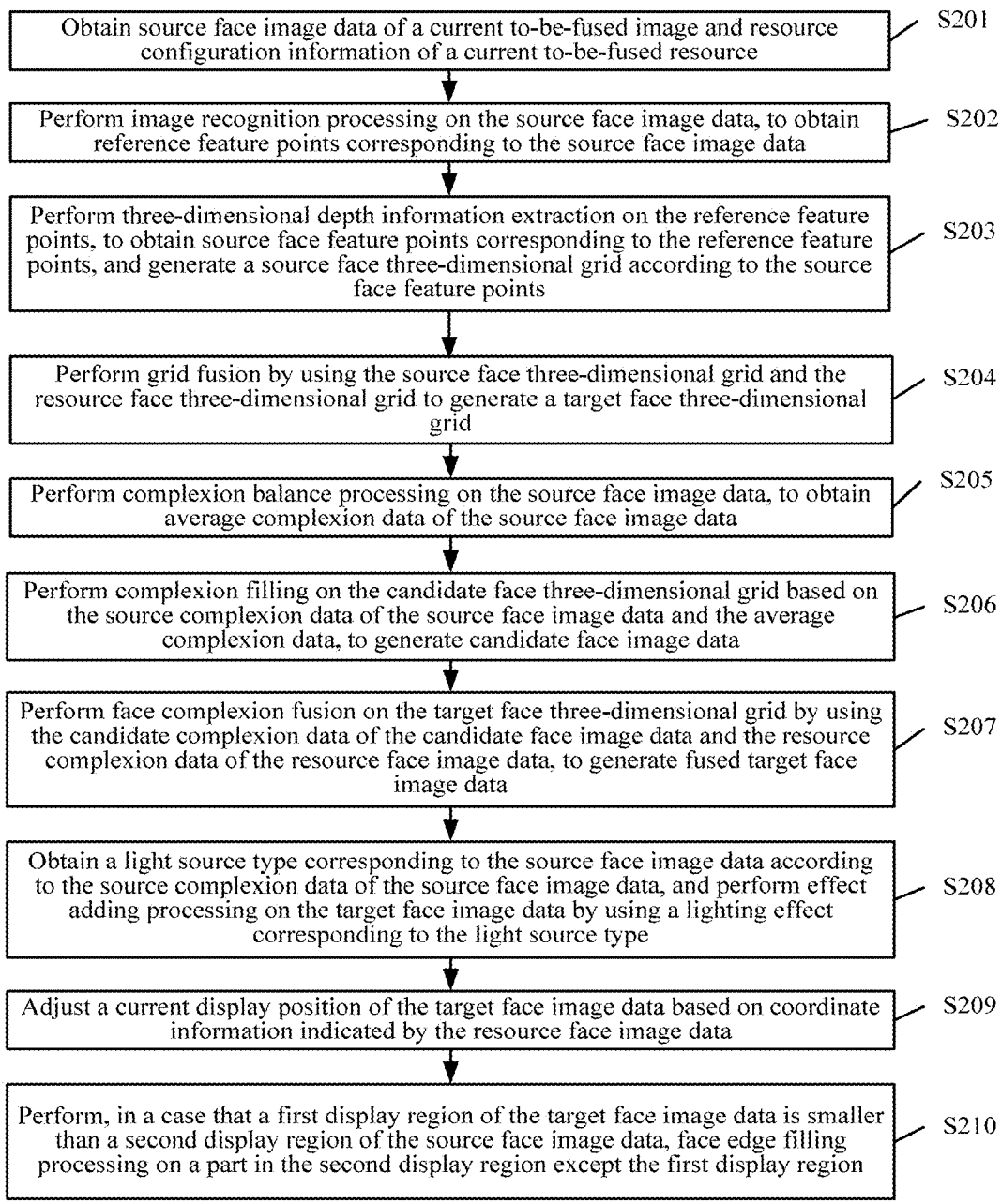
FIG. 6 is a schematic flowchart of another image fusion method according to an embodiment of this application.

FIG. 6 is a schematic flowchart of another image fusion method according to an embodiment of this application. As shown in FIG. 6, the method of this embodiment of this application may include the following step S201 to step S210.

S201. Obtain source face image data of a current to-be-fused image and resource configuration information of a current to-be-fused resource.

According to this embodiment of this application, an image fusion device may obtain source face image data of a current to-be-fused image and resource configuration information of a current to-be-fused resource. The source face image data may be face image data of a photo or a video taken by a user currently by using the image fusion device or selected from an album of the image fusion device. The current to-be-fused resource may be a resource model used for photo retouching that is in a photo retouching terminal application (for example, XXtupic, XXshop, or XXcamera) and that is selected by the user currently, for example, an anime character image or a celebrity photo. The resource configuration information may include 3D avatar information (for example, may be a file in obj format, and the file may include information representing resource face-related data, such as resource face image data, resource complexion data, and a resource face three-dimensional grid) of the current to-be-fused resource, information indicating a head effect in a final result image (the information may include an orientation (Euler angle pitch, yaw, and roll), a central position (a specified position of the final result image), scale information and camera information matching the scale information (for example, the information is depicted by using a perspective matrix), and the like of a resource 3D avatar in a world coordinate system), a 2D sticker and a 3D sticker, and a fusion degree alpha of a user face and a resource face (all frames may have the same fusion degree or each frame has a different fusion degree).

According to this embodiment of this application, the scale of the resource face image data for generating the target face image data and the scale of the source face image data need to correspond to the same dimension, but facial concavity and plumpness of them may not be completely consistent. Therefore, after the source face image data and the resource face image data are obtained, the scale of the source face image data may be adjusted according to the scale of the resource face image data, to make the source face image data and the resource face image data correspond to the same dimension.

S202. Perform image recognition processing on the source face image data, to obtain reference feature points corresponding to the source face image data.

According to this embodiment of this application, the image fusion device may perform image recognition processing on the source face image data, to obtain reference feature points corresponding to the source face image data. The image recognition processing may be a process of performing recognition and facial feature location on a user face in a photo by using a face detection technology (for example, face detection provided by the cross-platform computer vision library OpenCV, the new vision service platform Face++, or the Utu face detection). The reference feature points may be reference points indicating facial features, for example, points such as a facial contour, an eye contour, a nose, and lips, and may be 83 reference points, or may be 68 reference points shown in FIG. 3. The specific point quantity may be determined by developers according to requirements.

S203. Perform three-dimensional depth information extraction on the reference feature points, to obtain source face feature points corresponding to the reference feature points, and generate a source face three-dimensional grid according to the source face feature points.

According to this embodiment of this application, the image fusion device may perform three-dimensional depth information extraction on the reference feature points, to obtain source face feature points corresponding to the reference feature points, and generate a source face three-dimensional grid according to the source face feature points. The three-dimensional depth information extraction may be a process of deducing feature points that can reflect the source face image data in a three-dimensional model based on the foregoing reference feature points by matching facial feature points of a standard three-dimensional model. The source face feature points may be further deepened points based on the reference feature points. For example, through the three-dimensional depth information extraction on the foregoing 68 or 83 reference points, 1000 deepened source face feature points may be obtained, which may be vertexes of triangular patches in FIG. 4. The source face three-dimensional grid may be a 3D face grid model corresponding to the face in the source face image data, and may be a 3D grid model of a user face formed by connecting the source face feature points, for example, a 3D face grid shown in FIG. 4 or similar to a 3D face grid of only half of a face in FIG. 4.

S204. Perform grid fusion by using the source face three-dimensional grid and the resource face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

Specifically, the image fusion device may perform grid fusion by using the resource face three-dimensional grid and the source face three-dimensional grid to generate a target face three-dimensional grid. According to this embodiment of this application, the resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. According to this embodiment of this application, when the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG.

4, the resource face three-dimensional grid finally projected on a 2D image may present a side face effect.

In this embodiment of this application, the image fusion device may calculate target face feature points of a target face according to the face feature points in the source face three-dimensional grid and the resource face three-dimensional grid, and then generate a target face three-dimensional grid according to the calculated target face feature points. For example, a 3D source face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device may use algorithms such as an MLS method, affine transformation, and image distortion, to make facial feature positions of the source face image data and the resource face image data tend to facial feature positions indicated by the foregoing red face feature points, namely, the target face feature points, to achieve the objective of face fusion.

S205. Perform complexion balance processing on the source face image data, to obtain average complexion data of the source face image data.

According to this embodiment of this application, if types of the source face three-dimensional grid and the resource face three-dimensional grid are inconsistent, grid supplementing needs to be performed on the source face three-dimensional grid, to generate a candidate face three-dimensional grid. The types may be grid elements in the source face three-dimensional grid and the resource face three-dimensional grid. Candidate complexion data of the candidate face three-dimensional grid may be symmetrical source face image data, namely, the candidate complexion data of the candidate face three-dimensional grid may be regarded as the source complexion data. For example, if the finally generated candidate face image data is the face image in FIG. 5A, the face complexion in FIG. 5A is consistent with the face complexion in FIG. 5B.

In this embodiment of this application, the candidate complexion data of the candidate face three-dimensional grid may include two parts, namely, complexion data of a part of the candidate face three-dimensional grid matching the source face three-dimensional grid is the source complexion data, and complexion data of a part of the candidate face three-dimensional grid not matching the source face three-dimensional grid is average complexion data. Specifically, the image fusion device may perform complexion balance processing on the source face image data, to obtain average complexion data of the source face image data. The complexion balance processing may be a process of removing effects such as shadows caused by light or the like from the source face image data to obtain a complexion average value. The average complexion data may be a pixel point set formed by average values of pixel point data obtained after shadows of the source complexion data are removed.

S206. Perform complexion filling on the candidate face three-dimensional grid based on the source complexion data of the source face image data and the average complexion data, to generate candidate face image data.

Specifically, the image fusion device may perform complexion filling on the candidate face three-dimensional grid based on the source complexion data of the source face image data and the average complexion data, to generate candidate face image data. Complexion data of a part in the candidate face three-dimensional grid matching the source face three-dimensional grid may be filled by the source complexion data of the source face image data, and complexion data of a part in the candidate face three-dimensional grid not matching the source face three-dimensional grid may be filled by the average complexion data. The candidate complexion data of the candidate face image data may include the source complexion data and the average complexion data. For example, if the finally generated candidate face image data is the face image in FIG. 5A, the complexion of the right face in FIG. 5A is the face complexion in FIG. 5B, and the complexion of the left face in FIG. 5A is complexion obtained after the face complexion in FIG. 5B is averaged.

S207. Perform face complexion fusion on the target face three-dimensional grid by using the candidate complexion data of the candidate face image data and the resource complexion data of the resource face image data, to generate fused target face image data.

According to this embodiment of this application, after generating the target face three-dimensional grid, the image fusion device needs to perform complexion filling on different triangular patches in the target face three-dimensional grid to obtain the final target face image data.

Specifically, the image fusion device may perform face complexion fusion on the target face three-dimensional grid by using the candidate complexion data of the candidate face image data and the resource complexion data of the resource face image data, to generate the fused target face image data. According to this embodiment of this application, the candidate complexion data may be a set of candidate pixel points forming the candidate face image data, and the resource complexion data may be a set of resource pixel points forming the resource face image data.

In this embodiment of this application, the image fusion device may calculate target pixel points based on the candidate pixel points and the resource pixel points and by using a fusion degree, to generate target face image data according to the target pixel points. The fusion degree may be a fusion value set according to an empirical value, and the general value ranges from 0 to 1.

In a specific implementation of this embodiment of this application, it may be set that: pixels of a feature point of a triangular patch in a candidate face three-dimensional grid are: CandidateB, CandidateG, and CandidateR, pixels of a facial feature point at a corresponding position on the corresponding triangular patch in a resource face three-dimensional grid are: ResourceB, ResourceG, and ResourceR, pixels of a feature point at the corresponding position on the corresponding triangular patch in a target face three-dimensional grid are: TargetB, TargetG, and TargetR, and the fusion degree in the resource configuration information is: alpha, there are:

$$TargetB = (1.0 - alpha) * CandidateB + alpha * ResourceB$$

$$TargetG = (1.0 - alpha) * CandidateG + alpha * ResourceG$$

$$TargetR = (1.0 - alpha) * CandidateR + alpha * ResourceR$$

Therefore, each pixel value of the target face image data may be obtained, to obtain the target face image data.

In this embodiment of this application, by analyzing the function of the average complexion data in complexion fusion of the target face image data, authenticity of the finally obtained target face image data is increased.

S208. Obtain a light source type corresponding to the source face image data according to the source complexion data of the source face image data, and perform effect adding processing on the target face image data by using a lighting effect corresponding to the light source type.

According to this embodiment of this application, after generating the target face image data, the image fusion device may obtain the light source type corresponding to the source face image data according to the source complexion data of the source face image data. The image fusion device may compare the average complexion with a complexion of each region in the source face image data, to obtain a region of brightness and the average complexion and a region of darkness and the average complexion, to further deduce the light source type, for example, a plurality of point light sources or area light sources. The image fusion device may also collect result images of the source face image data in different specified lighting situations through depth learning, and then use the result images and the corresponding lighting situations as training data of a deep neural network (DNN), to train a DNN model that can output a light source type and a light source position when a picture is given.

Further, the image fusion device may perform effect adding processing on the target face image data by using the lighting effect corresponding to the light source type. For example, if the light source type corresponding to the source face image data is a point light source from the left face direction, the image fusion device may add a lighting effect of the point light source in the left face direction to the finally obtained target face image data.

In this embodiment of this application, the image fusion device may further stick 2D and 3D stickers in the foregoing resource configuration information onto the target face image data according to the corresponding position and zOrder, for example, wear a 3D glasses sticker on the face of the generated target face image data.

S209. Adjust a current display position of the target face image data based on coordinate information indicated by the resource face image data.

According to this embodiment of this application, after generating the target face image data, the image fusion device may further adjust the current display position of the target face image data based on the coordinate information indicated by the resource face image data. For example, the obtained target face image data is placed on the specified position according to the coordinate information (including the Euler direction and the central point) indicated by the resource face image data in the foregoing resource configuration information and the resource scale.

S210. Perform, in a case that a first display region of the target face image data is smaller than a second display region of the source face image data, face edge filling processing on a part in the second display region except the first display region.

According to this embodiment of this application, when the first display region of the finally generated target face image data is smaller than the second display region of the source face image data, the image fusion device may perform face edge filling processing on a part in the second display region except the first display region. The first display region may be a range on a 2D screen to which the target face image data is mapped, the second display region may be a range on a 2D screen to which the source face image data is mapped, and that the first display region is smaller than the second display region may be expressed as that the face of the target face image data is smaller than the face of the source face image data. The face edge filling processing may be filling the part in the second display region except the first display region by using a filling algorithm (for example, the image restoration algorithm Inpainting provided by the OpenCV).

Further, after processing the additional technical effects on the target face image data completely, the image fusion device may output and display the finally obtained target face image data.

According to this embodiment of this application, after step S208 to step S210 are performed, the finally generated target face image data may be three-dimensional face image data, or may be two-dimensional face image data. When the target face image data is two-dimensional face image data, because the process of generating the target image data is implemented based on the three-dimensional model, the effect of the finally formed target face image data is more realistic in consideration of problems such as real light and shadows.

When step S208 to step S210 are performed, one or more steps thereof may be selected to be performed simultaneously.

In this embodiment of this application, by adding real lighting effects to the generated target face image data, and adjusting a display position of face image data and filling a face edge region, real effects of the finally outputted target face image data are further increased.

Figure 7:
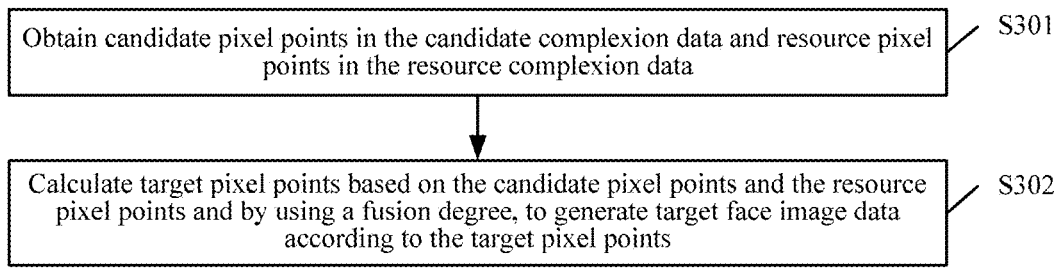
FIG. 7 is a schematic flowchart of another image fusion method according to an embodiment of this application.

In a specific implementation of this embodiment of this application, the performing face complexion fusion on the target face three-dimensional grid by using the candidate complexion data of the candidate face image data and the resource complexion data of the resource face image data, to generate fused target face image data may include the following several steps, as shown in FIG. 7:

S301. Obtain candidate pixel points in the candidate complexion data and resource pixel points in the resource complexion data.

According to this embodiment of this application, the candidate complexion data may be a set of candidate pixel points forming the candidate face image data, and the resource complexion data may be a set of resource pixel points forming the resource face image data. The image fusion device obtains candidate pixel points in the candidate complexion data and resource pixel points in the resource complexion data.

S302. Calculate target pixel points based on the candidate pixel points and the resource pixel points and by using a fusion degree, to generate target face image data according to the target pixel points.

Specifically, for the specific process of the image fusion device obtaining the target face image data based on the candidate pixel points and the resource pixel points and by using the fusion degree, reference may be made to the description in step S207, and details are not provided herein again.

In this embodiment of this application, by using a complexion fusion process accurate to pixel points, accuracy of the complexion fusion of the target face image data is improved.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate target face image data, authenticity of the finally obtained target face image data is improved. By analyzing the function of the average complexion data in complexion fusion of the target face image data, authenticity of the finally obtained target face image data is increased. By adding real lighting effects to the generated target face image data, and adjusting a display position of face image data and filling a face edge region, real effects of the finally outputted target face image data are further increased. By using a complexion fusion process accurate to pixel points, accuracy of the complexion fusion of the target face image data is improved.

When face fusion is performed based on a 2D model, generally there exists a situation in which a face angle of user image data and a face angle of resource face image data do not match completely. For example, if the user image is half of the face, the resource image is the front face or the user head turning left, the resource head turning right, and the like. When the foregoing situation exists, the face fusion algorithm in the related art can obtain less user face information, and during face fusion, the less user face information will affect the final matching result, causing poor authenticity of the generated target result image.

Figure 8:
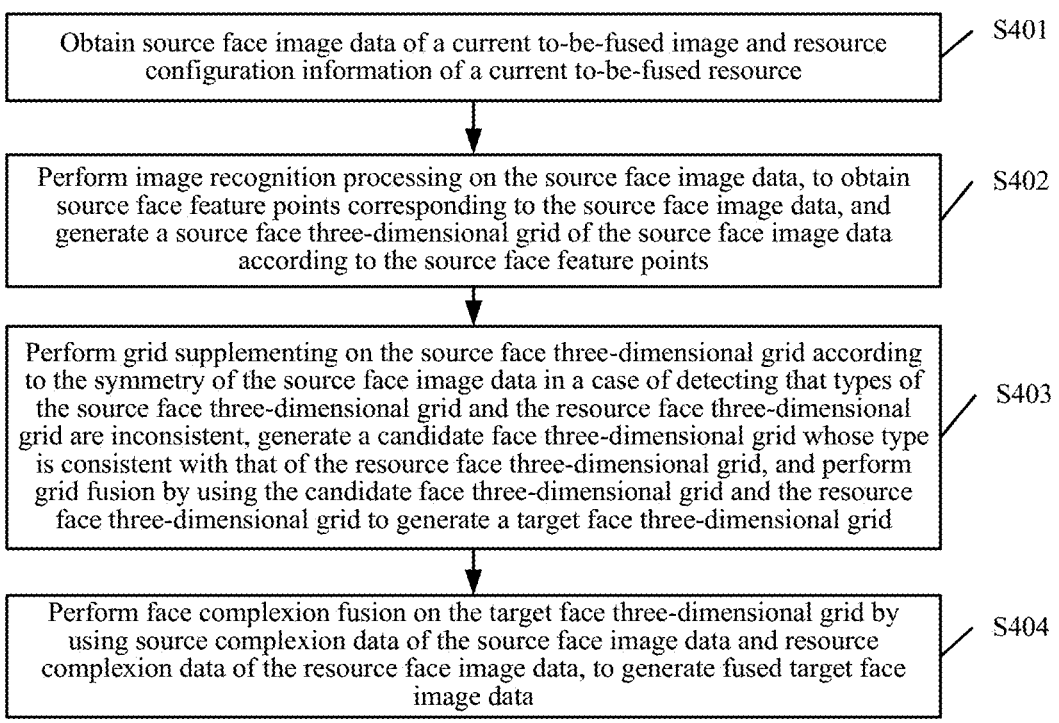
FIG. 8 is a schematic flowchart of another image fusion method according to an embodiment of this application.

To resolve the foregoing problem, an embodiment of this application provides a schematic flowchart of another image fusion method. As shown in FIG. 8, the method of this embodiment of this application may include the following step S401 to step S404.

S401. Obtain source face image data of a current to-be-fused image and resource configuration information of a current to-be-fused resource.

Specifically, an image fusion device may obtain source face image data of a current to-be-fused image and resource configuration information of a current to-be-fused resource. For the detailed obtaining process, reference may be made to the related description in step S201, and details are not provided herein again.

S402. Perform image recognition processing on the source face image data, to obtain source face feature points corresponding to the source face image data, and generate a source face three-dimensional grid of the source face image data according to the source face feature points.

Specifically, for the process of the image fusion device generating the source face three-dimensional grid, reference may be made to the related description in the foregoing step S202 to step S203, and details are not provided herein again.

S403. Perform grid supplementing on the source face three-dimensional grid according to the symmetry of the source face image data in a case of detecting that types of the source face three-dimensional grid and the resource face three-dimensional grid are inconsistent, generate a candidate face three-dimensional grid whose type is consistent with that of the resource face three-dimensional grid, and perform grid fusion by using the candidate face three-dimensional grid and the resource face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

According to this embodiment of this application, the resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. According to this embodiment of this application, when the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG. 4, the resource face three-dimensional grid finally projected on a 2D image may present a side face effect.

According to this embodiment of this application, only when the types of the source face three-dimensional grid and the resource face three-dimensional grid are consistent, a target face three-dimensional grid with good authenticity that is the same as a facial display region of the source face three-dimensional grid and the resource face three-dimensional grid can be generated according to a fusion algorithm. According to this embodiment of this application, that the types are consistent may be that grid elements in the source face three-dimensional grid and the resource face three-dimensional grid are consistent, and the grid elements may be grid orientations or grid display regions of the source face three-dimensional grid and the resource face three-dimensional grid. For example, when the facial display region indicated by the source face three-dimensional grid and the facial display region indicated by the resource face three-dimensional grid are consistent, and the source face three-dimensional grid and the resource face three-dimensional grid are similar to the standard front face shown in FIG. 5A or similar to the side face shown in FIG. 5B, it may be regarded that the types of the source face three-dimensional grid and the resource face three-dimensional grid are consistent. When the types of the source face three-dimensional grid and the resource face three-dimensional grid are inconsistent (for example, the source face three-dimensional grid is similar to the side face shown in FIG. 5B, and the resource face three-dimensional grid is similar to the standard front face shown in FIG. 5A), the image fusion device may first perform grid supplementing on the source face three-dimensional grid.

Specifically, when the types of the source face three-dimensional grid and the resource face three-dimensional grid are inconsistent, the image fusion device may perform grid supplementing on the source face three-dimensional grid according to the symmetry of the source face image data, to generate a candidate face three-dimensional grid whose type is consistent with that of the resource face three-dimensional grid. In a normal situation, a face of a person is symmetrical (nuances are ignored), and when the source face image data is side face image data (for example, the image in FIG. 5B), the source face three-dimensional grid generated after the image fusion device extracts the source face feature points is also for a side face. In this case, the image fusion device may supplement the source face image data as a standard front face (for example, the image in FIG. 5A is obtained after the image in FIG. 5B is supplemented) according to the face symmetry principle, and then generate a candidate face three-dimensional grid whose type is consistent with that of the resource face three-dimensional grid (the face three-dimensional grid corresponding to FIG. 5A is the candidate face three-dimensional grid) according to the supplemented source face image data.

According to this embodiment of this application, left and right facial expressions of image data of the standard front face obtained after the image fusion device supplements the source face image data (side face image data) according to the face symmetry principle are consistent, and left and right facial expressions of the further obtained candidate face three-dimensional grid are also consistent.

In this embodiment of this application, when the resource face three-dimensional grid is a standard front face whose left and right facial expressions are inconsistent, and the source face image data is side face image data, left and right facial expressions of the candidate face three-dimensional grid obtained after grid supplementing is performed on the source face three-dimensional grid according to the symmetry of the source face image data are inconsistent with left and right facial expressions of the resource face three-dimensional grid (for example, the left eye of the resource face indicated by the resource face image data is opened, and the right eye is closed, but the left eye of the user face indicated by the source face image data including only the left side face is opened. In this case, the right eye of the source face three-dimensional grid supplemented according to the symmetry of the source face image data is also opened, which is inconsistent with the right eye of the resource face three-dimensional grid). In this case, the image fusion device cannot perform grid fusion by using the candidate face three-dimensional grid and the foregoing resource face three-dimensional grid to generate the target face three-dimensional grid. For the foregoing situation, the image fusion device may adjust the left and right facial expressions of the candidate face three-dimensional grid to be consistent with the expression of the resource face three-dimensional grid by using an expression migration algorithm, so that facial expressions of the finally obtained candidate face three-dimensional grid and the foregoing resource face three-dimensional grid are consistent.

Further, the image fusion device may perform grid fusion by using the candidate face three-dimensional grid and the resource face three-dimensional grid, to generate the target face three-dimensional grid. According to this embodiment of this application, the types of the candidate face three-dimensional grid and the resource face three-dimensional grid are consistent, namely, the resource face three-dimensional grid and the candidate face three-dimensional grid on the same facial position have corresponding feature points. For example, the candidate face three-dimensional grid includes feature points of corners of two eyes, and the resource face three-dimensional grid also includes feature points of corners of two eyes. The target face three-dimensional grid may be a 3D face grid of the target face image data.

In this embodiment of this application, the image fusion device may calculate target face feature points of a target face according to the face feature points in the candidate face three-dimensional grid and the resource face three-dimensional grid, and then generate the target face three-dimensional grid according to the calculated target face feature points. For example, a 3D candidate face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device may use algorithms such as an MLS method, affine transformation, and image distortion, to make facial feature positions of the source face image data and the resource face image data tend to facial feature positions indicated by the foregoing red face feature points, namely, the target face feature points, to achieve the objective of face fusion.

S404. Perform face complexion fusion on the target face three-dimensional grid by using source complexion data of the source face image data and resource complexion data of the resource face image data, to generate fused target face image data.

Specifically, for the process of the image fusion device generating the target face image data, reference may be made to the related description in the foregoing step S205 to step S210, and details are not provided herein again.

In this embodiment of this application, source face image data of a current to-be-fused image and resource configuration information of a current to-be-fused resource are obtained, then image recognition processing is performed on the source face image data, to obtain source face feature points corresponding to the source face image data, and a source face three-dimensional grid of the source face image data is generated according to the source face feature points. Then, when it is detected that types of the source face three-dimensional grid and the resource face three-dimensional grid are inconsistent, grid supplementing is performed on the source face three-dimensional grid according to the symmetry of the source face image data, to generate a candidate face three-dimensional grid whose type is consistent with that of the resource face three-dimensional grid, and grid fusion is performed by using the candidate face three-dimensional grid and the resource face three-dimensional grid to generate a target face three-dimensional grid. Finally, face complexion fusion is performed on the target face three-dimensional grid by using source complexion data of the source face image data and resource complexion data of resource face image data, to generate fused target face image data. Even if there exists a situation in which a face angle of user image data and a face angle of the resource face image data do not match completely, a three-dimensional avatar of the user can be created, to deduce a full avatar of the user, and fusion at a three-dimensional level is better performed on the source face image data and the fusion resources according to the full avatar of the user.

The resource face image data in the foregoing method embodiment is a frame of resource data in a related terminal application, and the entire face fusion process is applicable to single-frame real-time processing, for example, may be used in a camera to preview in real time the look obtained after the user is fused to become another resource image. When a plurality of frames in a resource need to be processed, a plurality of frames of pictures in a video are processed circularly frame by frame to obtain a final face fused video.

Figure 9:
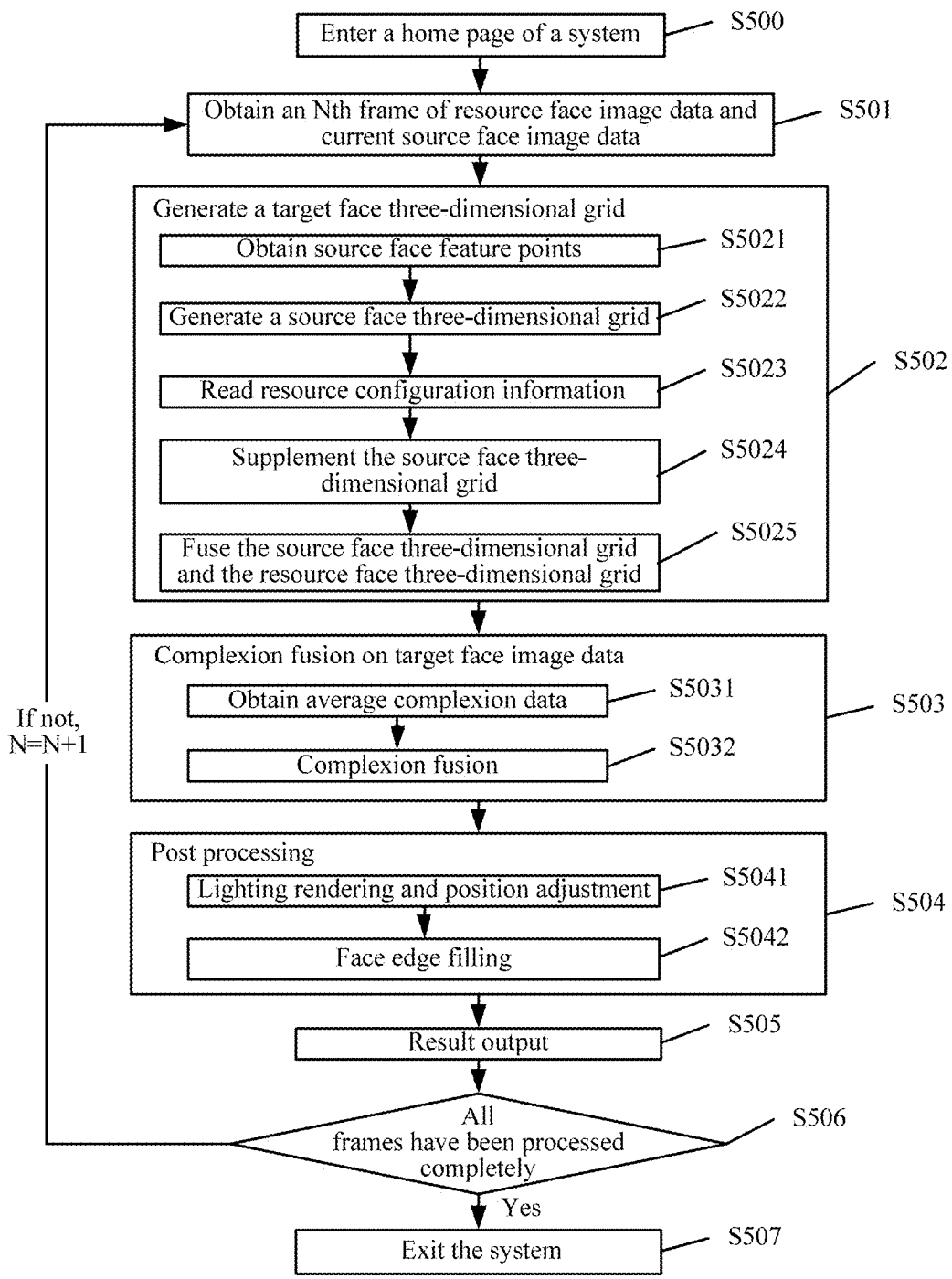
FIG. 9 is a schematic system diagram of an image fusion method according to an embodiment of this application.

The following describes a specific implementation process of a face fusion system by using an example, as shown in FIG. 9:

S500. Enter a system.

According to this embodiment of this application, the system is, for example, a system of a photo retouching terminal application. A user opens a photo retouching terminal application on an image fusion device, and enters a home page of the photo retouching terminal application.

S501. Obtain an $N^{th}$ frame of resource face image data and current source face image data.

Specifically, the home page of the photo retouching terminal application may have a prompt for prompting the user to select a resource. Before performing face fusion, the image fusion device may obtain resource configuration information of a frame (for example, an $N^{th}$ frame) of the resource in the photo retouching terminal application (for example, XXtupic, XXshop, or XXcamera) according to the resource selected by the user. In a case that the obtained resource has a total of M frames, the value range of N is M≥N≥1, where N and M are positive integers. The image fusion device may start processing from the first frame in the resource, namely, in this case, N=1. The resource configuration information may include 3D avatar information (for example, may be a file in obj format, and the file may include information representing resource face-related data, such as resource face image data, resource complexion data, and a resource face three-dimensional grid) of the current to-be-fused resource, information indicating a head effect in a final result image (the information may include an orientation (Euler angle pitch, yaw, and roll), a central position (a specified position of the final result image), scale information and camera information matching the scale information (for example, the information is depicted by using a perspective matrix), and the like of a resource 3D avatar in a world coordinate system), a 2D sticker and a 3D sticker, and a fusion degree alpha of a user face and a resource face (all frames may have the same fusion degree or each frame has a different fusion degree). According to this embodiment of this application, the photo retouching terminal application may guide the user to take a selfie or a video, or select a photo or a video from an album. The process may be performed before or after the user selects the resource. The image fusion device may obtain source face image data of the photo or the video currently taken by the user or selected from the album.

According to this embodiment of this application, the scale of the resource face image data for generating the target face image data and the scale of the source face image data need to correspond to the same dimension, but facial concavity and plumpness of them may not be completely consistent. Therefore, after the source face image data and the resource face image data are obtained, the scale of the source face image data may be adjusted according to the scale of the resource face image data, to make the source face image data and the resource face image data correspond to the same dimension.

S502. Generate a target face three-dimensional grid.

Specifically, after obtaining the resource face image data and the source face image data, the image fusion device may further analyze the resource face image data and the source face image data to generate a target face three-dimensional grid. According to this embodiment of this application, the target face three-dimensional grid may be a facial three-dimensional grid model corresponding to a face in target face image data generated by the final face fusion. The specific implementation process may be implemented in steps S5021 to S5025:

S5021. Obtain source face feature points.

Specifically, the image fusion device may perform image recognition processing on the source face image data, to obtain reference feature points of the source face image data, and then perform depth information extraction on the reference feature points, to obtain source face feature points corresponding to the reference feature points. For the specific implementation process, reference may be made to the detailed description in step S202 and step S203, and details are not provided herein again.

S5022. Generate a source face three-dimensional grid.

Specifically, the image fusion device may connect the foregoing source face feature points into a source face grid formed by many triangular patches. For the specific implementation process, reference may be made to the detailed description in step S203, and details are not provided herein again.

S5023. Read resource configuration information.

According to this embodiment of this application, before performing face fusion, the image fusion device has obtained resource configuration information of the $N^{th}$ frame of the resource. In this case, the image fusion device may read related data in the resource configuration information.

S5024. Supplement the source face three-dimensional grid.

According to this embodiment of this application, when the types of the source face three-dimensional grid and the resource face three-dimensional grid are inconsistent (for example, the source face three-dimensional grid is similar to the side face shown in FIG. 5B, and the resource face three-dimensional grid is similar to the standard front face shown in FIG. 5A), the image fusion device may first perform grid supplementing on the source face three-dimensional grid. For the specific implementation process, reference may be made to the performing grid supplementing according to the face symmetry in step S204, and details are not provided herein again.

S5025. Fuse the source face three-dimensional grid and the resource face three-dimensional grid.

According to this embodiment of this application, the resource configuration information obtained in step S5023 includes the resource face three-dimensional grid, and the image fusion device may perform grid fusion on the source face three-dimensional grid and the resource face three-dimensional grid to generate the target face three-dimensional grid. For the specific fusion process, reference may be made to the detailed process in step S204, and details are not provided herein again.

S503. Complexion fusion on target face image data.

According to this embodiment of this application, after generating the target face three-dimensional grid, the image fusion device needs to perform complexion filling on different triangular patches in the target face three-dimensional grid to obtain the final target face image data. The specific process of performing complexion fusion on the target face image data may be implemented in steps S5031 to S5033:

S5031. Obtain average complexion data.

Specifically, the image fusion device may perform complexion balance processing on the source face image data, to obtain average complexion data of the source face image data. For the specific process, reference may be made to the description in step S205, and details are not provided herein again.

S5032. Complexion fusion.

Specifically, the image fusion device may perform complexion filling on the candidate face three-dimensional grid based on the source complexion data of the source face image data and the average complexion data, to generate candidate face image data, and then perform face complexion fusion on the target face three-dimensional grid by using the candidate complexion data of the candidate face image data and the resource complexion data of the resource face image data, to generate fused target face image data. For the specific implementation processes, reference may be made to the detailed description in step S206 and step S207, and details are not provided herein again.

S504. Post processing.

According to this embodiment of this application, the post processing may be later adjustment on the generated target face image data, so that the effect of the finally outputted target face image data is more realistic. Specifically, the processing processes described in step S5041 and step S5042 may be included.

S5041. Lighting rendering and position adjustment.

Specifically, the image fusion device may perform face complexion fusion on the target face three-dimensional grid by using candidate complexion data of the candidate face image data and resource complexion data of the resource face image data, to generate fused target face image data. Meanwhile, the image fusion device may adjust a current display position of the target face image data based on coordinate information indicated by the resource face image data. For the specific implementation processes, reference may be made to the detailed description in step S208 and step S209, and details are not provided herein again.

S5042. Face edge filling.

Specifically, when the first display region of the target face image data is smaller than the second display region of the source face image data, the image fusion device may perform face edge filling processing on a part in the second display region except the first display region. For the specific implementation process, reference may be made to the detailed description in step S210, and details are not provided herein again.

S505. Result output.

According to this embodiment of this application, after processing the additional technical effects on the target face image data completely, the image fusion device may output and display the finally obtained target face image data. In a case that face fusion is performed on an image, because the entire resource has only one frame, after the foregoing steps are processed completely, the target face image data may be saved as a picture file in a specified format, and outputted and displayed to the user.

S506. If the face fusion is for a video, detect whether all frames have been processed completely.

According to this embodiment of this application, if the face fusion is for a video, the image fusion device detects whether all M frames in the obtained resource have been processed completely through the foregoing steps S501 to 505. If detecting that all the M frames in the obtained resource have been processed completely, the image fusion device may save the target face image data as a video file in a specified format, and present a final fused video on an interface of the photo retouching terminal application. If the M frames have not been processed completely, the $N^{th}$ frame of the finally obtained target face image data needs to be written into a video file, and processing of the foregoing steps S501 to S505 is performed on an $(N+1)^{th}$ frame (a next frame of the $N^{th}$ frame), which is followed by recycling to obtain the final fused video.

S507. Exit the system when all the frames have been processed completely.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate target face image data, authenticity of the finally obtained target face image data is improved. By analyzing the function of the average complexion data in complexion fusion of the target face image data, authenticity of the finally obtained target face image data is increased. By adding real lighting effects to the generated target face image data, and adjusting a display position of face image data and filling a face edge region, real effects of the finally outputted target face image data are further increased. By using a complexion fusion process accurate to pixel points, accuracy of the complexion fusion of the target face image data is improved.

The following describes the image fusion device provided in the embodiments of this application in detail with reference to FIG. 10 to FIG. 14. The devices shown in FIG. 10 to FIG. 14 is configured to perform the methods in the embodiments shown in FIG. 2 and FIG. 9 of this application. For ease of description, only a part related to the embodiments of this application is shown. For specific technical details that are not disclosed, refer to the embodiments shown in FIG. 2 to FIG. 9 of this application.

Figure 10:
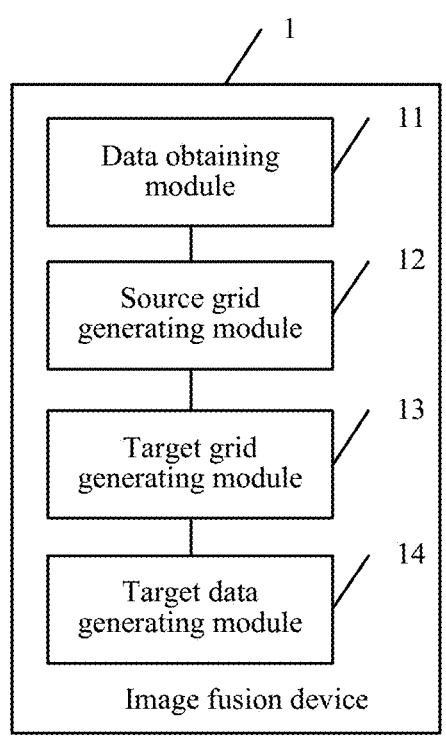
FIG. 10 is a schematic structural diagram of an image fusion device according to an embodiment of this application.

FIG. 10 is a schematic structural diagram of an image fusion device according to an embodiment of this application. As shown in FIG. 10, the image fusion device 1 of this embodiment of this application may include: a data obtaining module 11, a source grid generating module 12, a target grid generating module 13, and a target data generating module 14.

The data obtaining module 11 is configured to obtain source face image data of a current to-be-fused image and resource configuration information of a current to-be-fused resource.

In specific implementation, the image fusion device 1 may obtain source face image data of a current to-be-fused image and resource configuration information of a current to-be-fused resource. The source face image data may be face image data of a photo or a video taken by a user currently by using the image fusion device 1 or selected from an album of the image fusion device 1. The current to-be-fused resource may be a resource model used for photo retouching that is in a photo retouching terminal application (for example, XXtupic, XXshop, or XXcamera) and that is selected by the user currently, for example, an anime character image or a celebrity photo. The resource configuration information may include 3D avatar information (for example, may be a file in obj format, and the file may include information representing resource face-related data, such as resource face image data, resource complexion data, and a resource face three-dimensional grid) of the current to-be-fused resource, information indicating a head effect in a final result image (the information may include an orientation (Euler angle pitch, yaw, and roll), a central position (a specified position of the final result image), scale information and camera information matching the scale information (for example, the information is depicted by using a perspective matrix), and the like of a resource 3D avatar in a world coordinate system), a 2D sticker and a 3D sticker, and a fusion degree alpha of a user face and a resource face (all frames may have the same fusion degree or each frame has a different fusion degree).

According to this embodiment of this application, the scale of the resource face image data for generating the target face image data and the scale of the source face image data need to correspond to the same dimension, but facial concavity and plumpness of them may not be completely consistent. Therefore, after the source face image data and the resource face image data are obtained, the scale of the source face image data may be adjusted according to the scale of the resource face image data, to make the source face image data and the resource face image data correspond to the same dimension.

The source grid generating module 12 is configured to perform image recognition processing on the source face image data, to obtain source face feature points corresponding to the source face image data, and generate a source face three-dimensional grid of the source face image data according to the source face feature points.

According to this embodiment of this application, the source grid generating module 12 may perform image recognition processing on the source face image data, to obtain source face feature points corresponding to the source face image data. The image recognition processing may be a process of performing recognition and facial feature location on a user face in a photo by using a face detection technology (for example, face detection provided by the cross-platform computer vision library OpenCV, the new vision service platform Face++, or the Utu face detection), the source face feature points may be data points that can represent facial features (for example, a facial contour, an eye contour, a nose, and lips) of the source face image data.

According to this embodiment of this application, the source grid generating module 12 may perform image recognition processing on the source face image data, to obtain reference feature points of the source face image data (for example, may perform recognition and facial feature location on a user face in a photo, to obtain a certain quantity of reference feature points), and then perform three-dimensional depth information extraction on the reference feature points, to obtain source face feature points corresponding to the reference feature points. The three-dimensional depth information extraction may be a process of deducing feature points that can reflect the source face image data in a three-dimensional model based on the foregoing reference feature points by matching facial feature points of a standard three-dimensional model. The reference feature points may be reference points indicating facial features, for example, points such as a facial contour, an eye contour, a nose, and lips, and may be 83 reference points, or may be 68 reference points shown in FIG. 3. The specific point quantity may be determined by developers according to requirements. The source face feature points may be feature points that can correspond to the three-dimensional model of the source face image data after further deepening based on the reference feature points. For example, through the three-dimensional depth information extraction on the foregoing 68 or 83 reference points, 1000 deepened source face feature points may be obtained, which may be vertexes of triangular patches shown in FIG. 4.

Further, the source grid generating module 12 may generate a source face three-dimensional grid of the source face image data according to the source face feature points. The source face three-dimensional grid may be a 3D face grid model corresponding to the face in the source face image data, for example, a 3D face grid shown in FIG. 4 or similar to a 3D face grid of only half of a face in FIG. 4.

The target grid generating module 13 is configured to perform grid fusion by using the resource face three-dimensional grid and the source face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

In specific implementation, the target grid generating module 13 may perform grid fusion by using the resource face three-dimensional grid and the source face three-dimensional grid to generate a target face three-dimensional grid. The resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. According to this embodiment of this application, when the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG. 4, the resource face three-dimensional grid finally projected on a 2D image may present a side face effect.

According to this embodiment of this application, the target grid generating module 13 may calculate target face feature points of a target face according to the face feature points in the source face three-dimensional grid and the resource face three-dimensional grid, and then generate a target face three-dimensional grid according to the calculated target face feature points. For example, a 3D source face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device 1 may use algorithms such as an MLS method, affine transformation, and image distortion, to make facial feature positions of the source face image data and the resource face image data tend to facial feature positions indicated by the foregoing red face feature points, namely, the target face feature points, to achieve the objective of face fusion.

The target data generating module 14 is configured to perform face complexion fusion on the target face three-dimensional grid by using source complexion data of the source image data and resource complexion data of the resource face image data, to generate fused target face image data.

According to this embodiment of this application, after generating the target face three-dimensional grid, the image fusion device 1 needs to perform complexion filling on different triangular patches in the target face three-dimensional grid to obtain the final target face image data.

In specific implementation, the target data generating module 14 may perform face complexion fusion on the target face three-dimensional grid by using source complexion data of the source image data and resource complexion data of the resource face image data, to generate fused target face image data. According to this embodiment of this application, the source complexion data may be a set of source pixel points forming the source face image data, and the resource complexion data may be a set of resource pixel points forming the resource face image data.

According to this embodiment of this application, if types of the source face three-dimensional grid and the resource face three-dimensional grid are inconsistent, grid supplementing needs to be performed on the source face three-dimensional grid, to generate candidate face three-dimensional grid. The types may be grid elements in the source face three-dimensional grid and the resource face three-dimensional grid. Candidate complexion data of the candidate face three-dimensional grid may be symmetrical source face image data, namely, the candidate complexion data of the candidate face three-dimensional grid may be regarded as the source complexion data. The target data generating module 14 may calculate target pixel points of the target face image data according to the foregoing source pixel points, the resource pixel points, and a fusion degree in the resource configuration information (may be a fusion degree value set according to an empirical value, and the general value ranges from 0 to 1), to further fill the target face three-dimensional grid according to the target pixel points to generate the target face image data. For example, it is set that: pixels of a feature point on a triangular patch in a source face three-dimensional grid are: UserB, UserG, and UserR, pixels of a facial feature point at a corresponding position on the corresponding triangular patch in a resource face three-dimensional grid are: ResourceB, ResourceG, and ResourceR, pixels of a feature point at the corresponding position on the corresponding triangular patch in a target face three-dimensional grid are: TargetB, TargetG, and TargetR, and the fusion degree in the resource configuration information is: alpha, there are:

$$TargetB=(1.0-alpha)*UserB+alpha*ResourceB$$

$$TargetG=(1.0-alpha)*UserG+alpha*ResourceG$$

$$TargetR=(1.0-alpha)*UserR+alpha*ResourceR$$

Therefore, each pixel value of the target face image data may be obtained, to obtain the target face image data.

According to this embodiment of this application, the finally generated target face image data may be three-dimensional face image data, or may be two-dimensional face image data. When the target face image data is two-dimensional face image data, because the process of generating the target image data is implemented based on the three-dimensional model, the effect of the finally formed target face image data is more realistic in consideration of problems such as real light and shadows.

According to this embodiment of this application, the candidate complexion data of the candidate face three-dimensional grid may include two parts, namely, complexion data of a part of the candidate face three-dimensional grid matching the source face three-dimensional grid is the source complexion data, and complexion data of a part of the candidate face three-dimensional grid not matching the source face three-dimensional grid is average complexion data. The average complexion data may be complexion data obtained after the source complexion data is subjected to complexion balance processing. According to this embodiment of this application, the complexion balance processing may be a process of removing effects such as shadows caused by light or the like from the source face image data to obtain a complexion average value. The target data generating module 14 may calculate the target pixel points of the target face image data according to candidate pixel points of the foregoing candidate complexion data, the resource pixel points, and the fusion degree in the resource configuration information, to further fill the target face three-dimensional grid according to the target pixel points to generate the target face image data. The specific calculation process is consistent with the foregoing calculation process, and details are not provided herein again.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate target face image data, authenticity of the finally obtained target face image data is improved.

Figure 11:
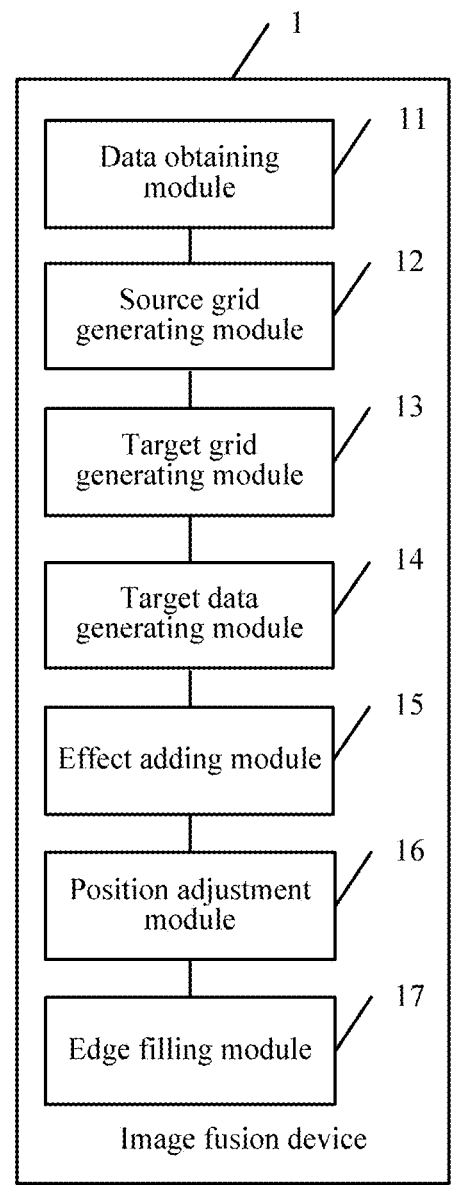
FIG. 11 is a schematic structural diagram of another image fusion device according to an embodiment of this application.

FIG. 11 is a schematic structural diagram of another image fusion device according to an embodiment of this application. As shown in FIG. 11, the image fusion device 1 of this embodiment of this application may include: a data obtaining module 11, a source grid generating module 12, a target grid generating module 13, a target data generating module 14, an effect adding module 15, a position adjustment module 16, and an edge filling module 17.

The data obtaining module 11 is configured to obtain source face image data of a current to-be-fused image and resource configuration information of a current to-be-fused resource.

In specific implementation, the data obtaining module 11 may obtain source face image data of a current to-be-fused image and resource configuration information of a current to-be-fused resource. The source face image data may be face image data of a photo or a video taken by a user currently by using the image fusion device or selected from an album of the image fusion device. The current to-be-fused resource may be a resource model used for photo retouching that is in a photo retouching terminal application (for example, XXtupic, XXshop, or XXcamera) and that is selected by the user currently, for example, an anime character image or a celebrity photo. The resource configuration information may include 3D avatar information (for example, may be a file in obj format, and the file may include information representing resource face-related data, such as resource face image data, resource complexion data, and a resource face three-dimensional grid) of the current to-be-fused resource, information indicating a head effect in a final result image (the information may include an orientation (Euler angle pitch, yaw, and roll), a central position (a specified position of the final result image), scale information and camera information matching the scale information (for example, the information is depicted by using a perspective matrix), and the like of a resource 3D avatar in a world coordinate system), a 2D sticker and a 3D sticker, and a fusion degree alpha of a user face and a resource face (all frames may have the same fusion degree or each frame has a different fusion degree).

According to this embodiment of this application, the scale of the resource face image data for generating the target face image data and the scale of the source face image data need to correspond to the same dimension, but facial concavity and plumpness of them may not be completely consistent. Therefore, after the source face image data and the resource face image data are obtained, the scale of the source face image data may be adjusted according to the scale of the resource face image data, to make the source face image data and the resource face image data correspond to the same dimension.

The source grid generating module 12 is configured to perform image recognition processing on the source face image data, to obtain source face feature points corresponding to the source face image data, and generate a source face three-dimensional grid of the source face image data according to the source face feature points.

According to this embodiment of this application, the source grid generating module 12 may perform image recognition processing on the source face image data, to obtain source face feature points corresponding to the source face image data, and generate a source face three-dimensional grid of the source face image data according to the source face feature points.

Figure 12:
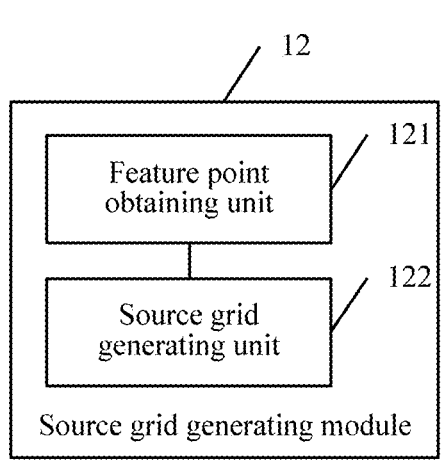
FIG. 12 is a schematic structural diagram of a source grid generating module according to an embodiment of this application.

FIG. 12 is a schematic structural diagram of a source grid generating module according to an embodiment of this application. As shown in FIG. 12, the source grid generating module 12 may include a feature point obtaining unit 121 and a source grid generating unit 122.

The feature point obtaining unit 121 is configured to perform image recognition processing on the source face image data, to obtain reference feature points of the source face image data.

In specific implementation, the feature points obtaining unit 121 may perform image recognition processing on the source face image data, to obtain reference feature points of the source face image data. The image recognition processing may be a process of performing recognition and facial feature location on a user face in a photo by using a face detection technology (for example, face detection provided by the cross-platform computer vision library OpenCV, the new vision service platform Face++, or the Utu face detection). The reference feature points may be reference points indicating facial features, for example, points such as a facial contour, an eye contour, a nose, and lips, and may be 83 reference points, or may be 68 reference points shown in FIG. 3. The specific point quantity may be determined by developers according to requirements.

The source grid generating unit 122 is configured to perform three-dimensional depth information extraction on the reference feature points, to obtain source face feature points corresponding to the reference feature points, and generate a source face three-dimensional grid according to the source face feature points.

In specific implementation, the source grid generating unit 122 may perform three-dimensional depth information extraction on the reference feature points, to obtain source face feature points corresponding to the reference feature points, and generate a source face three-dimensional grid according to the source face feature points. The three-dimensional depth information extraction may be a process of deducing feature points that can reflect the source face image data in a three-dimensional model based on the foregoing reference feature points by matching facial feature points of a standard three-dimensional model. The source face feature points may be further deepened points based on the reference feature points. For example, through the three-dimensional depth information extraction on the foregoing 68 or 83 reference points, 1000 deepened source face feature points may be obtained, which may be vertexes of triangular patches in FIG. 4. The source face three-dimensional grid may be a 3D face grid model corresponding to the face in the source face image data, and may be a 3D grid model of a user face formed by connecting the source face feature points, for example, a 3D face grid shown in FIG. 4 or similar to a 3D face grid of only half of a face in FIG. 4.

The target grid generating module 13 is configured to perform grid fusion by using the resource face three-dimensional grid and the source face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

In specific implementation, the target grid generating module 13 may perform grid fusion by using the resource face three-dimensional grid and the source face three-dimensional grid to generate a target face three-dimensional grid. According to this embodiment of this application, the resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. According to this embodiment of this application, when the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG. 4, the resource face three-dimensional grid finally projected on a 2D image may present a side face effect.

In this embodiment of this application, the target grid generating module 13 may calculate target face feature points of a target face according to the face feature points in the source face three-dimensional grid and the resource face three-dimensional grid, and then generate a target face three-dimensional grid according to the calculated target face feature points. For example, a 3D source face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device 1 may use algorithms such as an MLS method, affine transformation, and image distortion, to make facial feature positions of the source face image data and the resource face image data tend to facial feature positions indicated by the foregoing red face feature points, namely, the target face feature points, to achieve the objective of face fusion.

The target data generating module 14 is configured to perform face complexion fusion on the target face three-dimensional grid by using the source complexion data of the source face image data and the resource complexion data of the resource face image data, to generate fused target face image data.

According to this embodiment of this application, the target data generating module 14 may perform face complexion fusion on the target face three-dimensional grid by using source complexion data of the source face image data and resource complexion data of the resource face image data, to generate fused target face image data.

Figure 13:
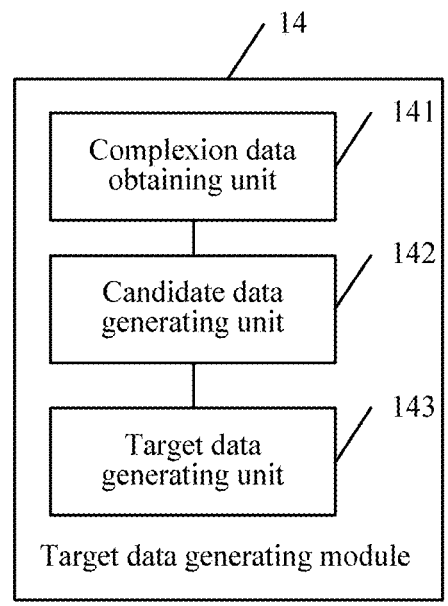
FIG. 13 is a schematic structural diagram of a target data generating module according to an embodiment of this application.

FIG. 13 is a schematic structural diagram of a target data generating module according to an embodiment of this application. As shown in FIG. 13, the target data generating module 14 may include: a complexion data obtaining unit 141, a candidate data generating unit 142, and a target data generating unit 143.

The complexion data obtaining unit 141 is configured to perform complexion balance processing on the source face image data, to obtain average complexion data of the source face image data.

According to this embodiment of this application, if types of the source face three-dimensional grid and the resource face three-dimensional grid are inconsistent, grid supplementing needs to be performed on the source face three-dimensional grid, to generate a candidate face three-dimensional grid. The types may be grid elements in the source face three-dimensional grid and the resource face three-dimensional grid. Candidate complexion data of the candidate face three-dimensional grid may be symmetrical source face image data, namely, the candidate complexion data of the candidate face three-dimensional grid may be regarded as the source complexion data. For example, if the finally generated candidate face image data is the face image in FIG. 5A, the face complexion in FIG. 5A is consistent with the face complexion in FIG. 5B.

In this embodiment of this application, the candidate complexion data of the candidate face three-dimensional grid may include two parts, namely, complexion data of a part of the candidate face three-dimensional grid matching the source face three-dimensional grid is the source complexion data, and complexion data of a part of the candidate face three-dimensional grid not matching the source face three-dimensional grid is average complexion data. In specific implementation, the complexion data obtaining unit 141 may perform complexion balance processing on the source face image data, to obtain average complexion data of the source face image data. The complexion balance processing may be a process of removing effects such as shadows caused by light or the like from the source face image data to obtain a complexion average value. The average complexion data may be a pixel point set formed by average values of pixel point data obtained after shadows of the source complexion data are removed.

The candidate data generating unit 142 is configured to perform complexion filling on the candidate face three-dimensional grid based on the source complexion data of the source face image data and the average complexion data, to generate candidate face image data.

According to this embodiment of this application, the candidate data generating unit 142 may perform complexion filling on the candidate face three-dimensional grid based on the source complexion data of the source face image data and the average complexion data, to generate candidate face image data. Complexion data of a part in the candidate face three-dimensional grid matching the source face three-dimensional grid may be filled by the source complexion data of the source face image data, and complexion data of a part in the candidate face three-dimensional grid not matching the source face three-dimensional grid may be filled by the average complexion data. The candidate complexion data of the candidate face image data may include the source complexion data and the average complexion data. For example, if the finally generated candidate face image data is the face image in FIG. 5A, the complexion of the right face in FIG. 5A is the face complexion in FIG. 5B, and the complexion of the left face in FIG. 5A is complexion obtained after the face complexion in FIG. 5B is averaged.

The target data generating unit 143 is configured to perform face complexion fusion on the target face three-dimensional grid by using the candidate complexion data of the candidate face image data and the resource complexion data of the resource face image data, to generate fused target face image data.

According to this embodiment of this application, after generating the target face three-dimensional grid, the image fusion device 1 needs to perform complexion filling on different triangular patches in the target face three-dimensional grid to obtain the final target face image data.

According to this embodiment of this application, the target data generating unit 143 may perform face complexion fusion on the target face three-dimensional grid by using the candidate complexion data of the candidate face image data and the resource complexion data of the resource face image data, to generate the fused target face image data. The candidate complexion data may be a set of candidate pixel points forming the candidate face image data, and the resource complexion data may be a set of resource pixel points forming the resource face image data.

According to this embodiment of this application, the target data generating unit 143 may calculate target pixel points based on the candidate pixel points and the resource pixel points and by using a fusion degree, to generate target face image data according to the target pixel points. The fusion degree may be a fusion value set according to an empirical value, and the general value ranges from 0 to 1.

According to this embodiment of this application, it may be set that: pixels of a feature point of a triangular patch in a candidate face three-dimensional grid are: CandidateB, CandidateG, and CandidateR, pixels of a facial feature point at a corresponding position on the corresponding triangular patch in a resource face three-dimensional grid are: ResourceB, ResourceG, and ResourceR, pixels of a feature point at the corresponding position on the corresponding triangular patch in a target face three-dimensional grid are: TargetB, TargetG, and TargetR, and the fusion degree in the resource configuration information is: alpha, there are:

$$TargetB=(1.0-alpha)*CandidateB+alpha*ResourceB$$

$$TargetG=(1.0-alpha)*CandidateG+alpha*ResourceG$$

$$TargetR=(1.0-alpha)*CandidateR+alpha*ResourceR$$

Therefore, each pixel value of the target face image data may be obtained, to obtain the target face image data.

According to this embodiment of this application, by analyzing the function of the average complexion data in complexion fusion of the target face image data, authenticity of the finally obtained target face image data is increased.

The effect adding module 15 is configured to obtain a light source type corresponding to the source face image data according to the source complexion data of the source face image data, and perform effect adding processing on the target face image data by using a lighting effect corresponding to the light source type.

According to this embodiment of this application, after the target face image data is generated, the effect adding module 15 may obtain the light source type corresponding to the source face image data according to the source complexion data of the source face image data. The effect adding module 15 may compare the average complexion with a complexion of each region in the source face image data, to obtain a region of brightness and the average complexion and a region of darkness and the average complexion, to further deduce the light source type, for example, a plurality of point light sources or area light sources. The effect adding module 15 may also collect result images of the source face image data in different specified lighting situations through depth learning, and then use the result images and the corresponding lighting situations as training data of a DNN, to train a DNN model that can output a light source type and a light source position when a picture is given.

Further, the effect adding module 15 may perform effect adding processing on the target face image data by using the lighting effect corresponding to the light source type. For example, if the light source type corresponding to the source face image data is a point light source from the left face direction, the effect adding module 15 may add a lighting effect of the point light source in the left face direction to the finally obtained target face image data.

In this embodiment of this application, the effect adding module 15 may further stick 2D and 3D stickers in the foregoing resource configuration information onto the target face image data according to the corresponding position and zOrder, for example, wear a 3D glasses sticker on the face of the generated target face image data.

The position adjustment module 16 is configured to adjust a current display position of the target face image data based on coordinate information indicated by the resource face image data.

According to this embodiment of this application, after the target face image data is generated, the position adjustment module 16 may further adjust the current display position of the target face image data based on the coordinate information indicated by the resource face image data. For example, the obtained target face image data is placed on the specified position according to the coordinate information (including the Euler direction and the central point) indicated by the resource face image data in the foregoing resource configuration information and the resource scale.

The edge filling module 17 is configured to perform, in a case that a first display region of the target face image data is smaller than a second display region of the source face image data, face edge filling processing on a part in the second display region except the first display region.

According to this embodiment of this application, when the first display region of the finally generated target face image data is smaller than the second display region of the source face image data, the edge filling module 17 may perform face edge filling processing on a part in the second display region except the first display region. The first display region may be a range on a 2D screen to which the target face image data is mapped, the second display region may be a range on a 2D screen to which the source face image data is mapped, and that the first display region is smaller than the second display region may be expressed as that the face of the target face image data is smaller than the face of the source face image data. The face edge filling processing may be filling the part in the second display region except the first display region by using a filling algorithm (for example, the image restoration algorithm Inpainting provided by the OpenCV).

Further, after processing the additional technical effects on the target face image data completely, the image fusion device 1 may output and display the finally obtained target face image data.

According to this embodiment of this application, after the effect adding module 15, the position adjustment module 16, and the edge filling module 17 perform the operations, the finally generated target face image data may be three-dimensional face image data, or may be two-dimensional face image data. When the target face image data is two-dimensional face image data, because the process of generating the target image data is implemented based on the three-dimensional model, the effect of the finally formed target face image data is more realistic in consideration of problems such as real light and shadows.

When the effect adding module 15, the position adjustment module 16, and the edge filling module 17 perform the operations, one or more modules may be selected simultaneously to perform the operations.

In this embodiment of this application, by adding real lighting effects to the generated target face image data, and adjusting a display position of face image data and filling a face edge region, real effects of the finally outputted target face image data are further increased.

Figure 14:
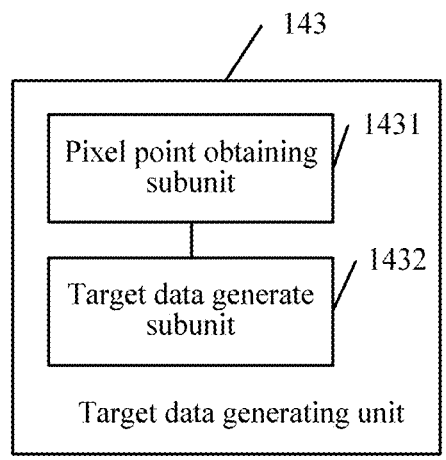
FIG. 14 is a schematic structural diagram of a target data generating unit according to an embodiment of this application.

In a specific implementation of this embodiment of this application, the target data generating unit shown in FIG. 14 may include a pixel point obtaining subunit 1431 and a target data generate subunit 1432.

The pixel point obtaining subunit 1431 is configured to obtain candidate pixel points in the candidate complexion data and resource pixel points in the resource complexion data.

According to this embodiment of this application, the candidate complexion data may be a set of candidate pixel points forming the candidate face image data, and the resource complexion data may be a set of resource pixel points forming the resource face image data. The pixel point obtaining subunit 1431 may obtain candidate pixel points in the candidate complexion data and resource pixel points in the resource complexion data.

The target data generate subunit 1432 is configured to calculate target pixel points based on the candidate pixel points and the resource pixel points and by using a fusion degree, to generate target face image data according to the target pixel points.

In specific implementation, for the specific process of the target data generate subunit 1432 obtaining the target face image data based on the candidate pixel points and the resource pixel points and by using the fusion degree, reference may be made to the description in the method embodiment, and details are not provided herein again.

According to this embodiment of this application, by using a complexion fusion process accurate to pixel points, accuracy of the complexion fusion of the target face image data is improved.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate target face image data, authenticity of the finally obtained target face image data is improved. By analyzing the function of the average complexion data in complexion fusion of the target face image data, authenticity of the finally obtained target face image data is increased. By adding real lighting effects to the generated target face image data, and adjusting a display position of face image data and filling a face edge region, real effects of the finally outputted target face image data are further increased. By using a complexion fusion process accurate to pixel points, accuracy of the complexion fusion of the target face image data is improved.

When face fusion is performed based on a 2D model, generally there exists a situation in which a face angle of user image data and a face angle of resource face image data do not match completely. For example, if the user image is half of the face, the resource image is the front face or the user head turning left, the resource head turning right, and the like. When the foregoing situation exists, the face fusion algorithm in the related art can obtain less user face information, and during face fusion the less user face information will affect the final matching result, causing poor authenticity of the generated target result image.

To resolve the foregoing problem, an embodiment of this application provides a schematic structural diagram of another image fusion device. For details, reference may be made to the schematic structural diagram shown in FIG. 10. The image fusion device may include: a data obtaining module 11, a source grid generating module 12, a target grid generating module 13, and a target data generating module 14.

The data obtaining module 11 is configured to obtain source face image data of a current to-be-fused image and resource configuration information of a current to-be-fused resource.

In specific implementation, for the process of the data obtaining module 11 obtaining the source face image data and the resource configuration information, reference may be made to the specific description in the foregoing method embodiment, and details are not provided herein again.

The source grid generating module 12 is configured to perform image recognition processing on the source face image data, to obtain source face feature points corresponding to the source face image data, and generate a source face three-dimensional grid of the source face image data according to the source face feature points.

In specific implementation, for the process of the source grid generating module 12 generating the source face three-dimensional grid, reference may be made to the specific description in the foregoing method embodiment, and details are not provided herein again.

The target grid generating module 13 is configured to perform grid supplementing on the source face three-dimensional grid according to the symmetry of the source face image data when it is detected that types of the source face three-dimensional grid and the resource face three-dimensional grid are inconsistent, generate a candidate face three-dimensional grid whose type is consistent with that of the resource face three-dimensional grid, and perform grid fusion by using the candidate face three-dimensional grid and the resource face three-dimensional grid to generate a target face three-dimensional grid.

In specific implementation, when it is detected that types of the source face three-dimensional grid and the resource face three-dimensional grid are inconsistent, the target grid generating module 13 may perform grid supplementing on the source face three-dimensional grid according to the symmetry of the source face image data, generate candidate face three-dimensional grid whose type is consistent with that of the resource face three-dimensional grid, and perform grid fusion by using the candidate face three-dimensional grid and the resource face three-dimensional grid to generate a target face three-dimensional grid.

According to this embodiment of this application, because scales of the source face image data and the resource face image data are in the same dimension, dimensions of the source face three-dimensional grid and the resource face three-dimensional grid are also in the same dimension.

According to this embodiment of this application, the resource face three-dimensional grid may be similar to the foregoing source face three-dimensional grid, may be a 3D face grid model corresponding to the face in the resource face image data, and may be a 3D face grid shown in FIG. 4 or a 3D face grid obtained after the orientation changes according to a Euler angle in a world coordinate system based on a 3D face grid shown in FIG. 4. The target face three-dimensional grid may be a 3D face grid of the target face image data. When the resource face three-dimensional grid is the 3D face grid shown in FIG. 4, the resource face three-dimensional grid finally projected on a 2D image may present a front face effect, and when the resource face three-dimensional grid is the 3D face grid obtained after the orientation changes according to a Euler angle in a world coordinate system based on the 3D face grid shown in FIG. 4, the resource face three-dimensional grid finally projected on a 2D image may present a side face effect.

According to this embodiment of this application, only when the types of the source face three-dimensional grid and the resource face three-dimensional grid are consistent, a target face three-dimensional grid with good authenticity that is the same as a facial display region of the source face three-dimensional grid and the resource face three-dimensional grid can be generated according to a fusion algorithm. That the types are consistent may be that grid elements in the source face three-dimensional grid and the resource face three-dimensional grid are consistent, and the grid elements may be grid orientations or grid display regions of the source face three-dimensional grid and the resource face three-dimensional grid. For example, when the facial display region indicated by the source face three-dimensional grid and the facial display region indicated by the resource face three-dimensional grid are consistent, and the source face three-dimensional grid and the resource face three-dimensional grid are similar to the standard front face shown in FIG. 5A or similar to the side face shown in FIG. 5B, it may be regarded that the types of the source face three-dimensional grid and the resource face three-dimensional grid are consistent. When the types of the source face three-dimensional grid and the resource face three-dimensional grid are inconsistent (for example, the source face three-dimensional grid is similar to the side face shown in FIG. 5B, and the resource face three-dimensional grid is similar to the standard front face shown in FIG. 5A), the image fusion device 1 may first perform grid supplementing on the source face three-dimensional grid.

In specific implementation, when the types of the source face three-dimensional grid and the resource face three-dimensional grid are inconsistent, the target grid generating module 13 may perform grid supplementing on the source face three-dimensional grid according to the symmetry of the source face image data, to generate a candidate face three-dimensional grid whose type is consistent with that of the resource face three-dimensional grid. In a normal situation, a face of a person is symmetrical (nuances are ignored), and when the source face image data is side face image data (for example, the image in FIG. 5B), the source face three-dimensional grid generated after the image fusion device extracts the source face feature points is also for a side face. In this case, the target grid generating module 13 may supplement the source face image data as a standard front face (for example, the image in FIG. 5A is obtained after the image in FIG. 5B is supplemented) according to the face symmetry principle, and then generate a candidate face three-dimensional grid whose type is consistent with that of the resource face three-dimensional grid (the face three-dimensional grid corresponding to FIG. 5A is the candidate face three-dimensional grid) according to the supplemented source face image data.

According to this embodiment of this application, left and right facial expressions of image data of the standard front face obtained after the target grid generating module 13 supplements the source face image data (side face image data) according to the face symmetry principle are consistent, and left and right facial expressions of the further obtained candidate face three-dimensional grid are also consistent.

In this embodiment of this application, when the resource face three-dimensional grid is a standard front face whose left and right facial expressions are inconsistent, and the source face image data is side face image data, left and right facial expressions of the candidate face three-dimensional grid obtained after grid supplementing is performed on the source face three-dimensional grid according to the symmetry of the source face image data are inconsistent with left and right facial expressions of the resource face three-dimensional grid (for example, the left eye of the resource face indicated by the resource face image data is opened, and the right eye is closed, but the left eye of the user face indicated by the source face image data including only the left side face is opened. In this case, the right eye of the source face three-dimensional grid supplemented according to the symmetry of the source face image data is also opened, which is inconsistent with the right eye of the resource face three-dimensional grid). In this case, the target grid generating module 13 cannot perform grid fusion by using the candidate face three-dimensional grid and the foregoing resource face three-dimensional grid to generate the target face three-dimensional grid. For the foregoing situation, the target grid generating module 13 may adjust the left and right facial expressions of the candidate face three-dimensional grid to be consistent with the expression of the resource face three-dimensional grid by using an expression migration algorithm, so that facial expressions of the finally obtained candidate face three-dimensional grid and the foregoing resource face three-dimensional grid are consistent.

Further, the target grid generating module 13 may perform grid fusion by using the candidate face three-dimensional grid and the resource face three-dimensional grid, to generate the target face three-dimensional grid. The types of the candidate face three-dimensional grid and the resource face three-dimensional grid are consistent, namely, the resource face three-dimensional grid and the candidate face three-dimensional grid on the same facial position have corresponding feature points. For example, the candidate face three-dimensional grid includes feature points of corners of two eyes, and the resource face three-dimensional grid also includes feature points of corners of two eyes. The resource face three-dimensional grid and the candidate face three-dimensional grid on the same facial position have corresponding feature points. The target face three-dimensional grid may be a 3D face grid of the target face image data.

In this embodiment of this application, the target grid generating module 13 may calculate target face feature points of a target face according to the face feature points in the candidate face three-dimensional grid and the resource face three-dimensional grid, and then generate the target face three-dimensional grid according to the calculated target face feature points. For example, a 3D candidate face three-dimensional grid (namely, a 3D face grid of a user) has 1000 source face feature points with depth information, which are marked to be green, a 3D resource face three-dimensional grid has 1000 resource face feature points with depth information, which are marked to be blue, average points of each corresponding point of the 1000 face feature points of the user and each corresponding point of the 1000 face feature points of the resource (corresponding points at the same position are averaged, and there are a total of 1000 point pairs) are marked to be red, and the finally generated 1000 red face feature points are the target face feature points. The foregoing 1000 red face feature points may form more than 1900 triangles, and a face three-dimensional grid depicted by corresponding more than 1900 triangular patches is the target face three-dimensional grid. According to this embodiment of this application, the image fusion device 1 may use algorithms such as an MLS method, affine transformation, and image distortion, to make facial feature positions of the source face image data and the resource face image data tend to facial feature positions indicated by the foregoing red face feature points, namely, the target face feature points, to achieve the objective of face fusion.

The target data generating module 14 is configured to perform face complexion fusion on the target face three-dimensional grid by using source complexion data of the source face image data and resource complexion data of the resource face image data, to generate fused target face image data.

In specific implementation, for the process of the target data generating module 14 generating the target face image data, reference may be made to the specific description in the foregoing method embodiment, and details are not provided herein again.

An embodiment of this application further provides a computer storage medium. The computer storage medium may store a plurality of instructions, the instructions being suitable for being loaded by a processor and performing the method steps in the foregoing embodiments shown in FIG. 2 to FIG. 9. For the specific execution process, reference may be made to the specific description of the embodiments shown in FIG. 2 to FIG. 9, and details are not provided herein again.

Figure 15:
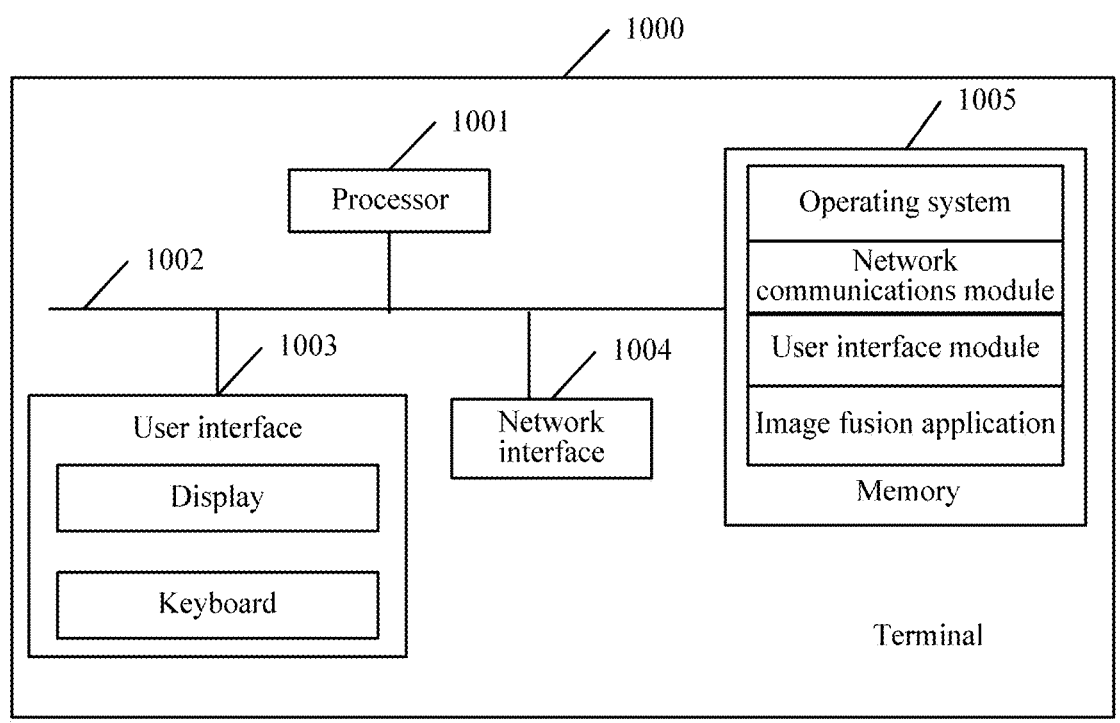
FIG. 15 is a schematic structural diagram of a terminal according to an embodiment of this application.

FIG. 15 is a schematic structural diagram of a terminal according to an embodiment of this application. As shown in FIG. 15, the terminal 1000 may include at least one processor 1001 such as a CPU, at least one network interface 1004, a user interface 1003, a memory 1005, and at least one communications bus 1002. The communications bus 1002 is configured to implement connection and communication between the components. The user interface 1003 may include a display, a keyboard, and optionally, the user interface 1003 may further include a standard wired interface and a standard wireless interface. The network interface 1004 may include a standard wired interface and a wireless interface (such as a WI-FI interface). The memory 1005 may be a high-speed RAM memory, or may be a non-volatile memory, for example, at least one magnetic disk memory. The memory 1005 may further be at least one storage apparatus located far away from the processor 1001. As shown in FIG. 15, the memory 1005, which is used as a computer storage medium, may include an operating system, a network communications module, a user interface module, and a face fusion application.

In the terminal 1000 shown in FIG. 15, the user interface 1003 is mainly configured to: provide an input interface for a user, and obtain data entered by the user. The network interface 1004 is mainly configured to communicate data with a user terminal. The processor 1001 may be configured to invoke the face fusion application stored in the memory 1005 and specifically perform the following operations:

obtaining source face image data of a current to-be-fused image and resource configuration information of a current to-be-fused resource, the resource configuration information including resource face image data, resource complexion data, and a resource face three-dimensional grid;

performing image recognition processing on the source face image data, to obtain source face feature points corresponding to the source face image data, and generating a source face three-dimensional grid of the source face image data according to the source face feature points;

performing grid fusion by using the resource face three-dimensional grid and the source face three-dimensional grid to generate a target face three-dimensional grid; and performing face complexion fusion on the target face three-dimensional grid by using source complexion data of the source face image data and resource complexion data of the resource face image data, to generate fused target face image data.

In an embodiment, when performing image recognition processing on the source face image data, to obtain source face feature points corresponding to the source face image data, and generating a source face three-dimensional grid of the source face image data according to the source face feature points, the processor 1001 specifically performs the following operations:

performing image recognition processing on the source face image data, to obtain reference feature points of the source face image data; and performing three-dimensional depth information extraction on the reference feature points, to obtain source face feature points corresponding to the reference feature points, and generating a source face three-dimensional grid according to the source face feature points.

In an embodiment, when performing grid fusion by using the resource face three-dimensional grid and the source face three-dimensional grid to generate a target face three-dimensional grid, the processor 1001 specifically performs the following operation:

performing grid supplementing on the source face three-dimensional grid according to the symmetry of the source face image data when it is detected that types of the source face three-dimensional grid and the resource face three-dimensional grid are inconsistent, generating a candidate face three-dimensional grid whose type is consistent with that of the resource face three-dimensional grid, and performing grid fusion by using the candidate face three-dimensional grid and the resource face three-dimensional grid to generate a target face three-dimensional grid.

In an embodiment, when performing face complexion fusion on the target face three-dimensional grid by using source complexion data of the source image data and resource complexion data of the resource face image data, to generate fused target face image data, the processor 1001 specifically performs the following operations:

performing complexion balance processing on the source face image data, to obtain average complexion data of the source face image data;

performing complexion filling on the candidate face three-dimensional grid based on the source complexion data of the source face image data and the average complexion data, to generate candidate face image data; and performing face complexion fusion on the target face three-dimensional grid by using candidate complexion data of the candidate face image data and the resource complexion data of the resource face image data, to generate the fused target face image data, where the candidate complexion data includes the source complexion data and the average complexion data.

In an embodiment, when performing face complexion fusion on the target face three-dimensional grid by using candidate complexion data of the candidate face image data and the resource complexion data of the resource face image data, to generate the fused target face image data, the processor 1001 specifically performs the following operations:

obtaining candidate pixel points in the candidate complexion data and resource pixel points in the resource complexion data; and calculating target pixel points based on the candidate pixel points and the resource pixel points and by using a fusion degree, and generating the target face image data according to the target pixel points.

In an embodiment, the processor 1001 is further configured to perform the following operation:

obtaining a light source type corresponding to the source face image data according to the source complexion data of the source face image data, and performing effect adding processing on the target face image data by using a lighting effect corresponding to the light source type.

In an embodiment, the processor 1001 is further configured to perform the following operation:

adjusting a current display position of the target face image data based on coordinate information indicated by the resource face image data.

In an embodiment, the processor 1001 is further configured to perform the following operation:

performing, in a case that a first display region of the target face image data is smaller than a second display region of the source face image data, face edge filling processing on a part in the second display region except the first display region.

In this embodiment of this application, source face image data of a current to-be-fused image and resource configuration information of a current to-be-fused resource are obtained, where the resource configuration information includes resource face image data, resource complexion data, and a resource face three-dimensional grid, then image recognition processing is performed on the source face image data, to obtain source face feature points corresponding to the source face image data, and a source face three-dimensional grid of the source face image data is generated according to the source face feature points, then grid fusion is performed by using the resource face three-dimensional grid and the source face three-dimensional grid to generate a target face three-dimensional grid, and finally face complexion fusion is performed on the target face three-dimensional grid by using source complexion data of the source face image data and resource complexion data of the resource face image data, to generate fused target face image data. By analyzing the process of fusing the resource face three-dimensional grid and the source face three-dimensional grid into the target face three-dimensional grid based on a three-dimensional model, and performing complexion fusion on the target face three-dimensional grid to generate target face image data, authenticity of the finally obtained target face image data is improved. By analyzing the function of the average complexion data in complexion fusion of the target face image data, authenticity of the finally obtained target face image data is increased. By adding real lighting effects to the generated target face image data, and adjusting a display position of face image data and filling a face edge region, real effects of the finally outputted target face image data are further increased. By using a complexion fusion process accurate to pixel points, accuracy of the complexion fusion of the target face image data is improved.

A person of ordinary skill in the art may understand that all or some of the processes of the methods in the embodiments may be implemented by a computer program instructing relevant hardware. The program may be stored in a computer readable storage medium. When the program is executed, the procedures of the methods in the embodiments are performed. The storage medium may be a magnetic disk, an optical disc, a read-only memory (ROM), or a random access memory (RAM).

The foregoing disclosure is merely embodiments of this application, and certainly is not intended to limit the protection scope of this application. Therefore, equivalent variations made in accordance with the claims of this application shall fall within the scope of this application.

What is claimed is:

1. An image fusion method performed at a computing device having a processor and memory and a plurality of programs stored in the memory, the method comprising:
    obtaining source face image data of a current to-be-fused image and resource configuration information of a current to-be-fused resource, the resource configuration information comprising resource face image data, resource complexion data, and a resource face three-dimensional grid;
    obtaining source face feature points from the source face image data through image recognition;
    generating a source face three-dimensional grid of the source face image data according to the source face feature points;
    performing grid fusion to the resource face three-dimensional grid and the source face three-dimensional grid to generate a target face three-dimensional grid; and
    performing face complexion fusion on the target face three-dimensional grid by using source complexion data of the source face image data and the resource complexion data of the resource face image data, to generate fused target face image data.

2. The method according to claim 1, wherein the obtaining source face feature points from the source face image data through image recognition comprises:
    obtaining reference feature points of the source face image data through the image recognition;
    extracting three-dimensional depth information from the reference feature points, to obtain the source face feature points corresponding to the reference feature points; and
    generating the source face three-dimensional grid according to the source face feature points.

3. The method according to claim 1, wherein the performing grid fusion to the resource face three-dimensional grid and the source face three-dimensional grid to generate a target face three-dimensional grid comprises:
    performing grid supplementing on the source face three-dimensional grid according to a symmetry of the source face image data after detecting that types of the source face three-dimensional grid and the resource face three-dimensional grid are inconsistent;
generating a candidate face three-dimensional grid whose type is consistent with that of the resource face three-dimensional grid; and
performing the grid fusion to the candidate face three-dimensional grid and the resource face three-dimensional grid to generate the target face three-dimensional grid.

4. The method according to claim 3, wherein the performing face complexion fusion on the target face three-dimensional grid by using source complexion data of the source face image data and resource complexion data of the resource image data, to generate fused target face image data comprises:
performing complexion balance on the source face image data, to obtain average complexion data of the source face image data;
performing complexion filling on the candidate face three-dimensional grid based on the source complexion data of the source face image data and the average complexion data, to generate candidate face image data; and
performing face complexion fusion on the target face three-dimensional grid using candidate complexion data of the candidate face image data and the resource complexion data of the resource face image data, to generate the fused target face image data, wherein the candidate complexion data comprises the source complexion data and the average complexion data.

5. The method according to claim 4, wherein the performing face complexion fusion on the target face three-dimensional grid using candidate complexion data of the candidate face image data and the resource complexion data of the resource face image data, to generate the fused target face image data comprises:
obtaining candidate pixel points in the candidate complexion data and resource pixel points in the resource complexion data;
calculating target pixel points based on the candidate pixel points and the resource pixel points using a fusion degree; and
generating the target face image data according to the target pixel points.

6. The method according to claim 1, further comprising:
obtaining a light source type corresponding to the source face image data according to the source complexion data of the source face image data; and
adding a light effect on the target face image data corresponding to the light source type.

7. The method according to claim 1, further comprising:
adjusting a current display position of the target face image data based on coordinate information indicated by the resource face image data.

8. The method according to claim 1, further comprising:
in accordance with a determination that a first display region of the target face image data is smaller than a second display region of the source face image data, filling face edge on a part of the second display region except the first display region.

9. A computing device, comprising: a processor and memory, the memory storing a plurality of computer programs, wherein the computer programs, when executed by the processor, perform operations including:
obtaining source face image data of a current to-be-fused image and resource configuration information of a current to-be-fused resource, the resource configuration information comprising resource face image data, resource complexion data, and a resource face three-dimensional grid;
obtaining source face feature points from the source face image data through image recognition;
generating a source face three-dimensional grid of the source face image data according to the source face feature points;
performing grid fusion to the resource face three-dimensional grid and the source face three-dimensional grid to generate a target face three-dimensional grid; and
performing face complexion fusion on the target face three-dimensional grid by using source complexion data of the source face image data and the resource complexion data of the resource face image data, to generate fused target face image data.

10. The computing device according to claim 9, wherein the obtaining source face feature points from the source face image data through image recognition comprises:
obtaining reference feature points of the source face image data through the image recognition;
extracting three-dimensional depth information from the reference feature points, to obtain the source face feature points corresponding to the reference feature points; and
generating the source face three-dimensional grid according to the source face feature points.

11. The computing device according to claim 9, wherein the performing grid fusion to the resource face three-dimensional grid and the source face three-dimensional grid to generate a target face three-dimensional grid comprises:
performing grid supplementing on the source face three-dimensional grid according to a symmetry of the source face image data after detecting that types of the source face three-dimensional grid and the resource face three-dimensional grid are inconsistent;
generating a candidate face three-dimensional grid whose type is consistent with that of the resource face three-dimensional grid; and
performing the grid fusion to the candidate face three-dimensional grid and the resource face three-dimensional grid to generate the target face three-dimensional grid.

12. The computing device according to claim 11, wherein the performing face complexion fusion on the target face three-dimensional grid by using source complexion data of the source face image data and resource complexion data of the resource image data, to generate fused target face image data comprises:
performing complexion balance on the source face image data, to obtain average complexion data of the source face image data;
performing complexion filling on the candidate face three-dimensional grid based on the source complexion data of the source face image data and the average complexion data, to generate candidate face image data; and
performing face complexion fusion on the target face three-dimensional grid using candidate complexion data of the candidate face image data and the resource complexion data of the resource face image data, to generate the fused target face image data, wherein the candidate complexion data comprises the source complexion data and the average complexion data.

13. The computing device according to claim 12, wherein the performing face complexion fusion on the target face three-dimensional grid using candidate complexion data of the candidate face image data and the resource complexion data of the resource face image data, to generate the fused target face image data comprises:
- obtaining candidate pixel points in the candidate complexion data and resource pixel points in the resource complexion data;
- calculating target pixel points based on the candidate pixel points and the resource pixel points using a fusion degree; and
- generating the target face image data according to the target pixel points.

14. The computing device according to claim 9, wherein the operations further comprise:
- obtaining a light source type corresponding to the source face image data according to the source complexion data of the source face image data; and
- adding a light effect on the target face image data corresponding to the light source type.

15. The computing device according to claim 9, wherein the operations further comprise:
- adjusting a current display position of the target face image data based on coordinate information indicated by the resource face image data.

16. The computing device according to claim 9, wherein the operations further comprise:
- in accordance with a determination that a first display region of the target face image data is smaller than a second display region of the source face image data, filling face edge on a part of the second display region except the first display region.

17. A non-transitory computer storage medium, storing a plurality of instructions, the instructions being configured for, when executed by a processor a computing device, perform operations including:
- obtaining source face image data of a current to-be-fused image and resource configuration information of a current to-be-fused resource, the resource configuration information comprising resource face image data, resource complexion data, and a resource face three-dimensional grid;
- obtaining source face feature points from the source face image data through image recognition;
- generating a source face three-dimensional grid of the source face image data according to the source face feature points;
- performing grid fusion to the resource face three-dimensional grid and the source face three-dimensional grid to generate a target face three-dimensional grid; and
- performing face complexion fusion on the target face three-dimensional grid by using source complexion data of the source face image data and the resource complexion data of the resource face image data, to generate fused target face image data.

18. The non-transitory computer storage medium according to claim 17, wherein the operations further comprise:
- obtaining a light source type corresponding to the source face image data according to the source complexion data of the source face image data; and
- adding a light effect on the target face image data corresponding to the light source type.

19. The non-transitory computer storage medium according to claim 17, wherein the operations further comprise:
- adjusting a current display position of the target face image data based on coordinate information indicated by the resource face image data.

20. The non-transitory computer storage medium according to claim 17, wherein the operations further comprise:
- in accordance with a determination that a first display region of the target face image data is smaller than a second display region of the source face image data, filling face edge on a part of the second display region except the first display region.

* * * * *